United States Patent
Cheng et al.

(10) Patent No.: US 10,631,308 B2
(45) Date of Patent: Apr. 21, 2020

(54) METHODS AND DEVICES FOR DATA TRANSMISSION WITHOUT GRANT DURING MEASUREMENT GAP

(71) Applicant: FG Innovation Company Limited, Tuen Mun (CN)

(72) Inventors: Yu-Hsin Cheng, Hsinchu (TW); Chie-Ming Chou, Hsinchu (TW)

(73) Assignee: FG Innovation Company Limited, Tuen Mun, New Territories (HK)

( * ) Notice: Subject to any disclaimer, the term of this patent is extended or adjusted under 35 U.S.C. 154(b) by 0 days.

(21) Appl. No.: 16/105,235

(22) Filed: Aug. 20, 2018

(65) Prior Publication Data

US 2019/0059093 A1 Feb. 21, 2019

Related U.S. Application Data

(60) Provisional application No. 62/547,289, filed on Aug. 18, 2017.

(51) Int. Cl.
| | |
|---|---|
| H04W 72/08 | (2009.01) |
| H04W 72/04 | (2009.01) |
| H04L 5/00 | (2006.01) |
| H04W 24/10 | (2009.01) |
| H04W 72/12 | (2009.01) |
| H04W 48/12 | (2009.01) |

(52) U.S. Cl.
CPC ......... *H04W 72/085* (2013.01); *H04L 5/0048* (2013.01); *H04L 5/0082* (2013.01); *H04L 5/0091* (2013.01); *H04W 24/10* (2013.01); *H04W 72/042* (2013.01); *H04W 72/1273* (2013.01); *H04L 5/001* (2013.01); *H04L 5/0023* (2013.01); *H04L 5/0064* (2013.01); *H04W 48/12* (2013.01); *H04W 72/1289* (2013.01)

(58) Field of Classification Search
CPC .................................................... H04W 72/085
USPC ........................................................ 370/252
See application file for complete search history.

(56) References Cited

U.S. PATENT DOCUMENTS

| | | | |
|---|---|---|---|
| 2011/0026805 A1* | 2/2011 | Hori | G06T 7/001 382/141 |
| 2015/0188793 A1* | 7/2015 | Zhao | H04L 5/1469 370/242 |
| 2015/0215929 A1* | 7/2015 | Damnjanovic | H04L 5/001 370/241 |
| 2015/0341803 A1* | 11/2015 | Kim | H04W 16/02 370/252 |
| 2017/0041820 A1* | 2/2017 | Wei | H04W 72/04 |
| 2018/0343659 A1* | 11/2018 | Hahn | H04W 36/00 |
| 2019/0052377 A1* | 2/2019 | Hwang | H04B 17/309 |
| 2019/0075585 A1* | 3/2019 | Deogun | H04W 72/1273 |

(Continued)

*Primary Examiner* — Peter G Solinsky
(74) *Attorney, Agent, or Firm* — ScienBiziP, P.C.

(57) ABSTRACT

A method includes transmitting, by transmitting circuitry of a base station, data to a user equipment (UE) in one of a plurality of measurement objects in a bandwidth part (BWP) of a first carrier during one of a plurality of measurement gap periods of the UE, and transmitting, by the transmitting circuitry, a preemption indication to the UE in a second carrier after the one of the plurality of measurement gap periods. The preemption indication contains at least one of time resource allocation information or frequency resource allocation information of the data contained in the one of the plurality of measurement objects.

28 Claims, 18 Drawing Sheets

(56) References Cited

U.S. PATENT DOCUMENTS

2019/0182000 A1\* 6/2019 Futaki .................. H04L 5/0046
2019/0229970 A1\* 7/2019 Bhattad ............... H04L 27/2666

\* cited by examiner

METHODS AND DEVICES FOR DATA TRANSMISSION WITHOUT GRANT DURING MEASUREMENT GAP

CROSS-REFERENCE TO RELATED APPLICATION(S)

The present application claims the benefit of and priority to a provisional U.S. patent application Ser. No. 62/547,289 filed on Aug. 18, 2017, entitled "Method and Apparatus for Low Latency Intra and Inter Frequency Measurement," (hereinafter referred to as "application"). The disclosure of the application is hereby incorporated fully by reference into the present application.

FIELD

The present disclosure generally relates to wireless communication, and more particularly, to methods and devices for data transmission without grant during measurement gap.

BACKGROUND

In the current wireless communication networks, such as (evolved) Long-Term Evolution ((e)LTE) and LTE-Advanced (LTE-A) networks, when a transceiver, for example, in a user equipment (UE) needs to perform signal quality measurements of a target cell, the UE switches from its current serving cell to the target cell during a measurement gap period to measure signal quality of the target cell. During the measurement gap period, the communication network does not schedule data transmission or reception for the UE in the serving cell (e.g., on the initial serving carrier). However, scheduling data transmission or reception around measure gaps may be no longer suitable in the next generation (e.g., the fifth generation (5G) New Radio (NR)) wireless communication networks, where the latency requirement for successful data transmission of ultra-reliable and low-latency communications (URLLC) services is envisaged to be in the sub-millisecond range. In addition, since data may be transmitted to a UE without grant in the next generation (e.g., 5G NR) wireless communication networks, the UE may receive data while taking measurements during measurement gap periods.

Thus, there is a need in the art for methods and devices for data transmission (e.g., downlink (DL) and/or uplink (UL)) without grant during measurement gap.

SUMMARY

The present disclosure is directed to methods and devices for data transmission without grant during measurement gap.

In a first aspect of the present disclosure, a method is disclosed, the method comprising: transmitting, by transmitting circuitry of a base station, data to a user equipment (UE) in one of a plurality of measurement objects in a bandwidth part (BWP) of a first carrier during one of a plurality of measurement gap periods of the UE; transmitting, by the transmitting circuitry, a preemption indication to the UE in a second carrier after the one of the plurality of measurement gap periods; wherein the preemption indication contains at least one of time resource allocation information or frequency resource allocation information of the data contained in the one of the plurality of measurement objects.

In an implementation of the first aspect of the present disclosure, the base station transmits the data to all of the plurality of measurement objects during the one of the plurality of measurement gap periods.

In another implementation of the first aspect of the present disclosure, the method further comprises: transmitting, by the transmitting circuitry, a measurement object configuration to the UE, the measurement object configuration containing a list of measurement object identifiers (IDs) identifying a measurement object for each of the plurality of measurement gap periods; wherein the base station transmits the data to the one of the plurality of measurement objects identified in the list during the one of the plurality of measurement gap periods.

In another implementation of the first aspect of the present disclosure, the method further comprises: transmitting, transmitting, by the transmitting circuitry, a measurement object configuration to the UE, the measurement object configuration containing an order by which the UE is to perform measurement using the plurality of measurement objects in the plurality of measurement gap periods; wherein the base station transmits the data to the one of the plurality of measurement objects in the one of the plurality of measurement gap periods based on the order.

In another implementation of the first aspect of the present disclosure, the order is based on one of: measurement object IDs identifying a corresponding measurement object for each of the plurality of measurement gap periods; or an explicitly configured order for each of the plurality of measurement gap periods.

In another implementation of the first aspect of the present disclosure, the preemption indication is included in downlink control information in the second carrier.

In another implementation of the first aspect of the present disclosure, the preemption indication includes demodulation information for decoding the data.

In another implementation of the first aspect of the present disclosure, the base station applies a precoding matrix for the data, the precoding matrix is the same as that of a reference signal contained in a first slot transmitted to the UE in the second carrier after the one of the plurality of measurement gap periods.

In another implementation of the first aspect of the present disclosure, the method further comprises: transmitting, by the transmitting circuitry, a measurement object configuration containing a saved data indicator to the UE; wherein, when the saved data indicator indicates YES, the UE saves the data in a soft buffer after the one of the plurality of measurement gap periods; wherein, when the saved data indicator indicates NO, the UE discards the data after the one of the plurality of measurement gap periods.

In another implementation of the first aspect of the present disclosure, the second carrier is a serving carrier, in which the base station and the UE are in data communication before the one of the plurality of measurement gap periods.

In a second aspect of the present disclosure, a method is disclosed, the method comprising: receiving, by receiving circuitry of a user equipment (UE), data in one of a plurality of measurement objects in a bandwidth part (BWP) of a first carrier during one of a plurality of measurement gap periods; receiving, by the receiving circuitry, a preemption indication in a second carrier after the one of the plurality of measurement gap periods; wherein the preemption indication contains at least one of time resource allocation information or frequency resource allocation information of the data contained in the one of the plurality of measurement objects.

In an implementation of the second aspect of the present disclosure, the method further comprises: receiving, by the receiving circuitry, a measurement object configuration, the measurement object configuration containing a list of measurement object identifiers (IDs) identifying a measurement object for each of the plurality of measurement gap periods; wherein the UE receives the data in the one of the plurality of measurement objects identified in the list during the one of the plurality of measurement gap periods.

In another implementation of the second aspect of the present disclosure, the method further comprises: receiving, by the receiving circuitry, a measurement object configuration, the measurement object configuration containing an order by which the UE is to perform measurement using the plurality of measurement objects in the plurality of measurement gap periods; wherein the UE receives the data in the one of the plurality of measurement objects in the one of the plurality of measurement gap periods based on the order.

In another implementation of the second aspect of the present disclosure, the order is based on one of: measurement object IDs identifying a corresponding measurement object for each of the plurality of measurement gap periods; or an explicitly configured order for each of the plurality of measurement gap periods.

In another implementation of the second aspect of the present disclosure, the preemption indication is included in downlink control information in the second carrier.

In another implementation of the second aspect of the present disclosure, the preemption indication includes demodulation information for decoding the data.

In another implementation of the second aspect of the present disclosure, the UE applies a precoding matrix for decoding the data, the precoding matrix is the same as that of a reference signal contained in a first slot received by the UE in the second carrier after the one of the plurality of measurement gap periods.

In another implementation of the second aspect of the present disclosure, the method further comprises: receiving, by the receiving circuitry, a measurement object configuration, the measurement object configuration containing a saved data indicator; wherein, when the saved data indicator indicates YES, the UE saves the data in a soft buffer after the one of the plurality of measurement gap periods; wherein, when the saved data indicator indicates NO, the UE discards the data after the one of the plurality of measurement gap periods.

In another implementation of the second aspect of the present disclosure, the second carrier is a serving carrier, in which the UE receives data before performing measurement in the one of the plurality of measurement gap periods.

In a third aspect of the present disclosure, a user equipment (UE) is disclosed, the UE comprising: one or more non-transitory computer-readable media having computer-executable instructions embodied thereon; at least one processor coupled to the one or more non-transitory computer-readable media, and configured to execute the computer-executable instructions to receive, using receiving circuitry, data in one of a plurality of measurement objects in a bandwidth part (BWP) of a first carrier during one of a plurality of measurement gap periods; receive, using the receiving circuitry, a preemption indication in a second carrier of the UE after the one of the plurality of measurement gap periods; wherein the preemption indication contains at least one of time resource allocation information or frequency resource allocation information of the data contained in the one of the plurality of measurement objects.

In an implementation of the third aspect of the present disclosure, the at least one processor is further configured to execute the computer-executable instructions to: receive, using the receiving circuitry, a measurement object configuration, the measurement object configuration containing a list of measurement object identifiers (IDs) identifying a measurement object for each of the plurality of measurement gap periods; wherein the UE receives the data in the one of the plurality of measurement objects identified in the list during the one of the plurality of measurement gap periods.

In another implementation of the third aspect of the present disclosure, the at least one processor is further configured to execute the computer-executable instructions to: receive a measurement object configuration, the measurement object configuration containing an order by which the UE is to perform measurement using the plurality of measurement objects in the plurality of measurement gap periods; wherein the UE receives the data in the one of the plurality of measurement objects in the one of the plurality of measurement gap periods based on the order.

In another implementation of the third aspect of the present disclosure, the order is based on one of: measurement object IDs identifying a corresponding measurement object for each of the plurality of measurement gap periods; an explicitly configured order for each of the plurality of measurement gap periods.

In another implementation of the third aspect of the present disclosure, the preemption indication is included in downlink control information in the second carrier.

In another implementation of the third aspect of the present disclosure, the preemption indication includes demodulation information for decoding the data.

In another implementation of the third aspect of the present disclosure, the UE applies a precoding matrix for decoding the data, the precoding matrix is the same as that of a reference signal contained in a first slot received by the UE in the second carrier after the one of the plurality of measurement gap periods.

In another implementation of the third aspect of the present disclosure, the at least one processor is further configured to execute the computer-executable instructions to: receive, by the receiving circuitry, a measurement object configuration, the measurement object configuration containing a saved data indicator; wherein, when the saved data indicator indicates YES, the UE saves the data in a soft buffer after the one of the plurality of measurement gap periods; wherein, when the saved data indicator indicates NO, the UE discards the data after the one of the plurality of measurement gap periods.

In another implementation of the third aspect of the present disclosure, the second carrier is a serving carrier, in which the UE receives data before performing measurement in the one of the plurality of measurement gap periods.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
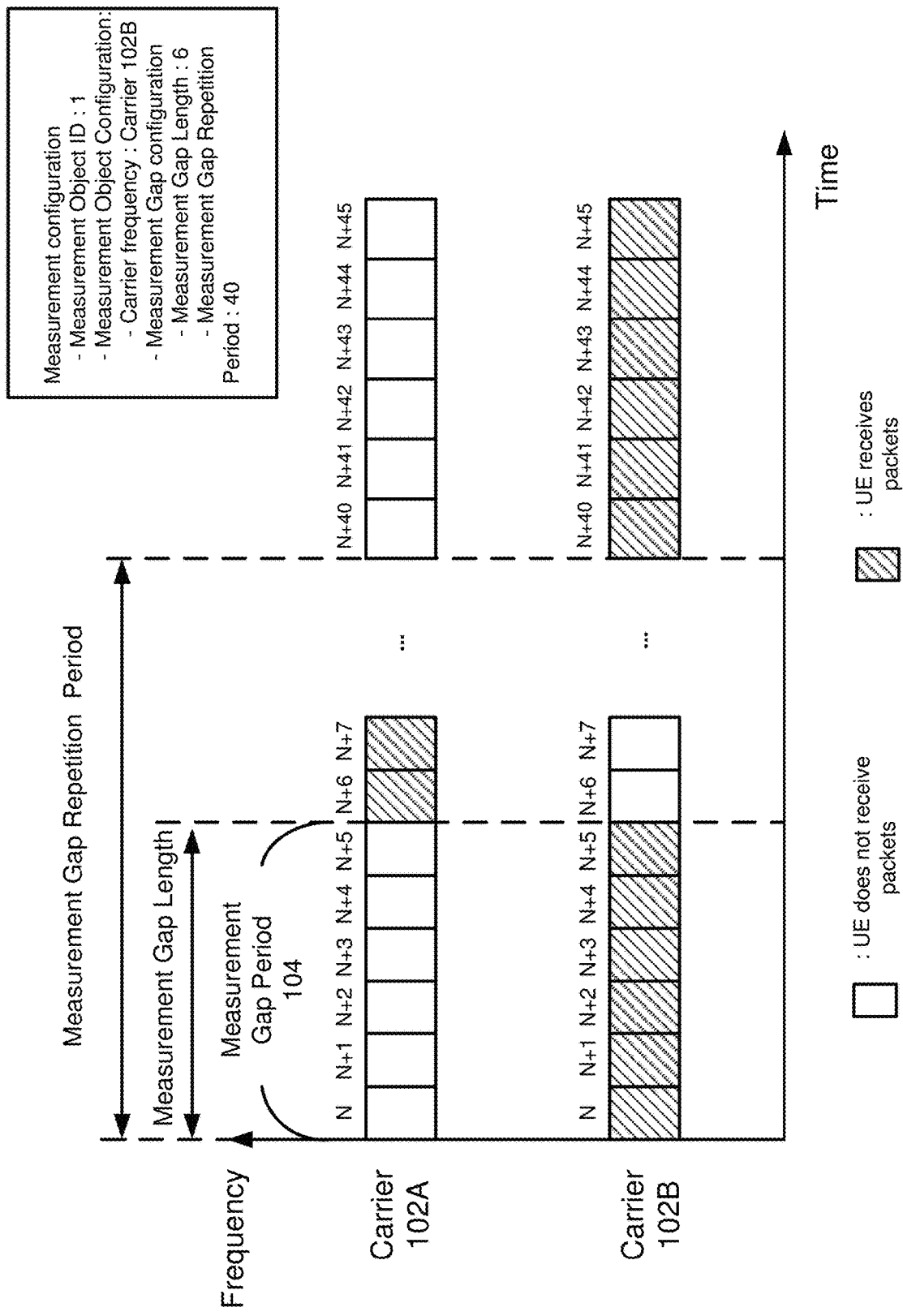
FIG. 1 is a diagram illustrating inter-carrier measurement operations in an LTE network.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., an (e)LTE system, an LTE-A system, or an LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), 5G Core Network (5GC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the 5GC, a next generation node B (gNB) as in the 5G-RAN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE, New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within radio coverage of the cell. More specifically, each cell (often referred to as a serving cell) provides services to serve one or more UEs within the cell's radio coverage, (e.g., each cell schedules the downlink and optionally uplink resources to at least one UE within the cell's radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as eMBB, mMTC, and URLLC, while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in a NR frame to support ProSe services.

FIG. 1 is a diagram illustrating inter-carrier measurement operations in an LTE network. Prior to a measurement gap period 104, a UE may be receiving data packets on a carrier 102A (e.g., a serving carrier). As shown in FIG. 1, during the measurement gap period 104, the UE stops reception of data on the carrier 102A, and switches from the carrier 102A to a carrier 102B (e.g., by reconfiguring its software and/or hardware) to take measurements. While the UE is measuring signal quality on the carrier 102B in the measurement gap period 104, the base station does not transmit and the UE does not receive any signals on the carrier 102A. However, in the next generation (e.g., 5G NR) wireless networks, base stations and UEs may perform uplink and downlink transmissions without grant for latency reduction. For example, the UE may receive data packets on the carrier 102A while taking measurements on the carrier 102B.

In the legacy (e)LTE wireless networks, since DL data transmission without grant may be sent in any time slot, in a case where the DL data without grant is transmitted to the UE while the UE is taking measurement during the measurement gap period on a different carrier, the UE does not receive the DL data, and would have failed to decode the DL data even after receiving a preemption indication. As a result, the UE has to request for retransmission of the DL data, thereby increasing transmission latency.

Figure 2:
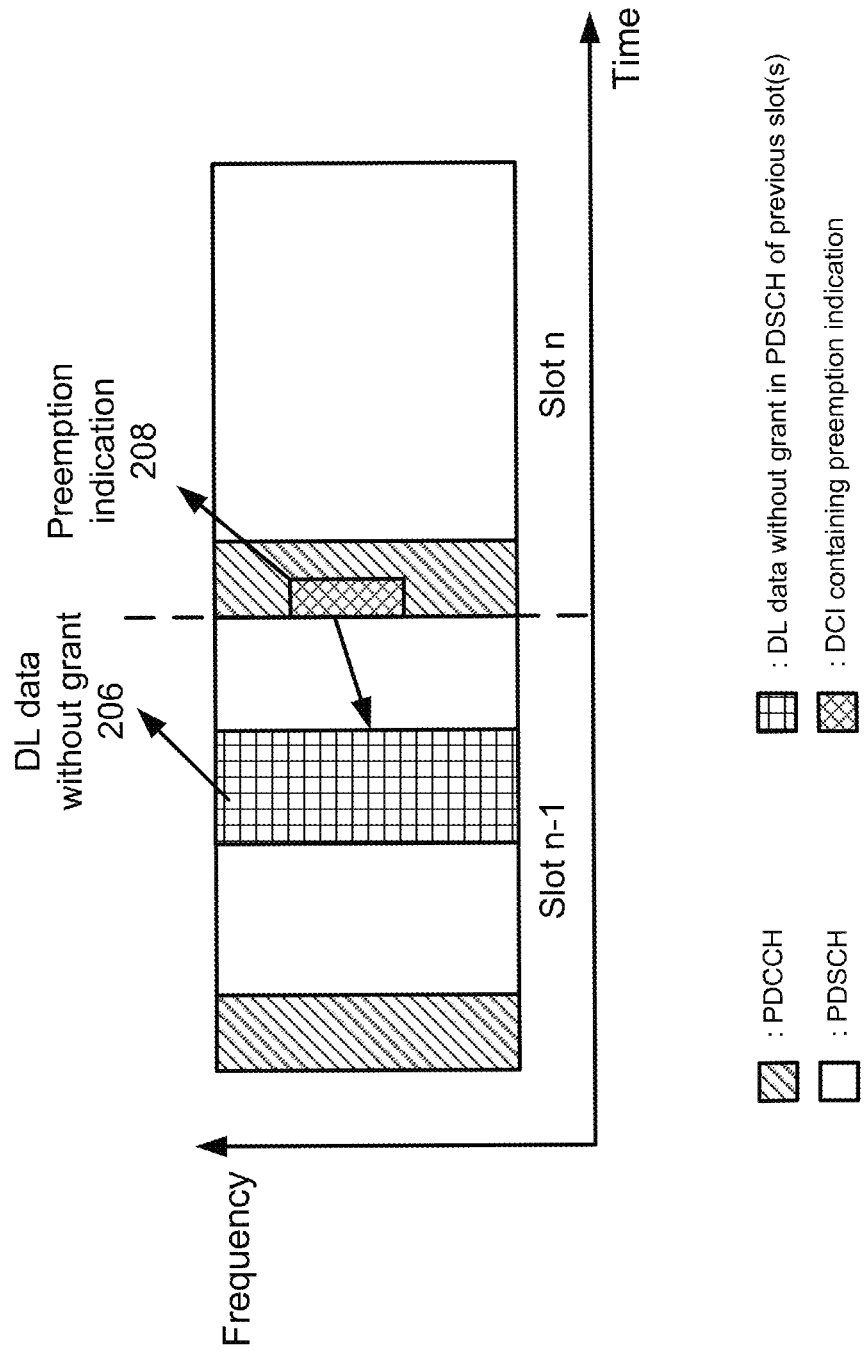
FIG. 2 is a diagram illustrating data transmission without grant, according to an example implementation of the present application.

FIG. 2 is a diagram illustrating data transmission without grant, according to an example implementation of the present application. As shown in FIG. 2, a UE may receive all the slots without further decoding even when there is no corresponding grant. To support DL data transmission without grant, a base station may transmit DL data without grant 206 to the UE in a physical downlink shared channel (PDSCH) in slot$_{n-1}$, and use a preemption indication 208 in a physical downlink control channel (PDCCH) in slot$_n$, to indicate to the UE that there is DL data without grant 206 received over the PDSCH in the previous time slot(s). The preemption indication 208 may be transmitted by group common downlink control information (DCI) under the next generation (e.g., 5G NR) wireless networks.

Furthermore, BWP has been introduced as a new frequency granularity under the next generation (e.g., 5G NR) wireless networks, which divides the full bandwidth of a frequency carrier into several small bandwidth parts for narrow band UEs which may not be capable of receiving the full bandwidth at the same time.

Figure 3:
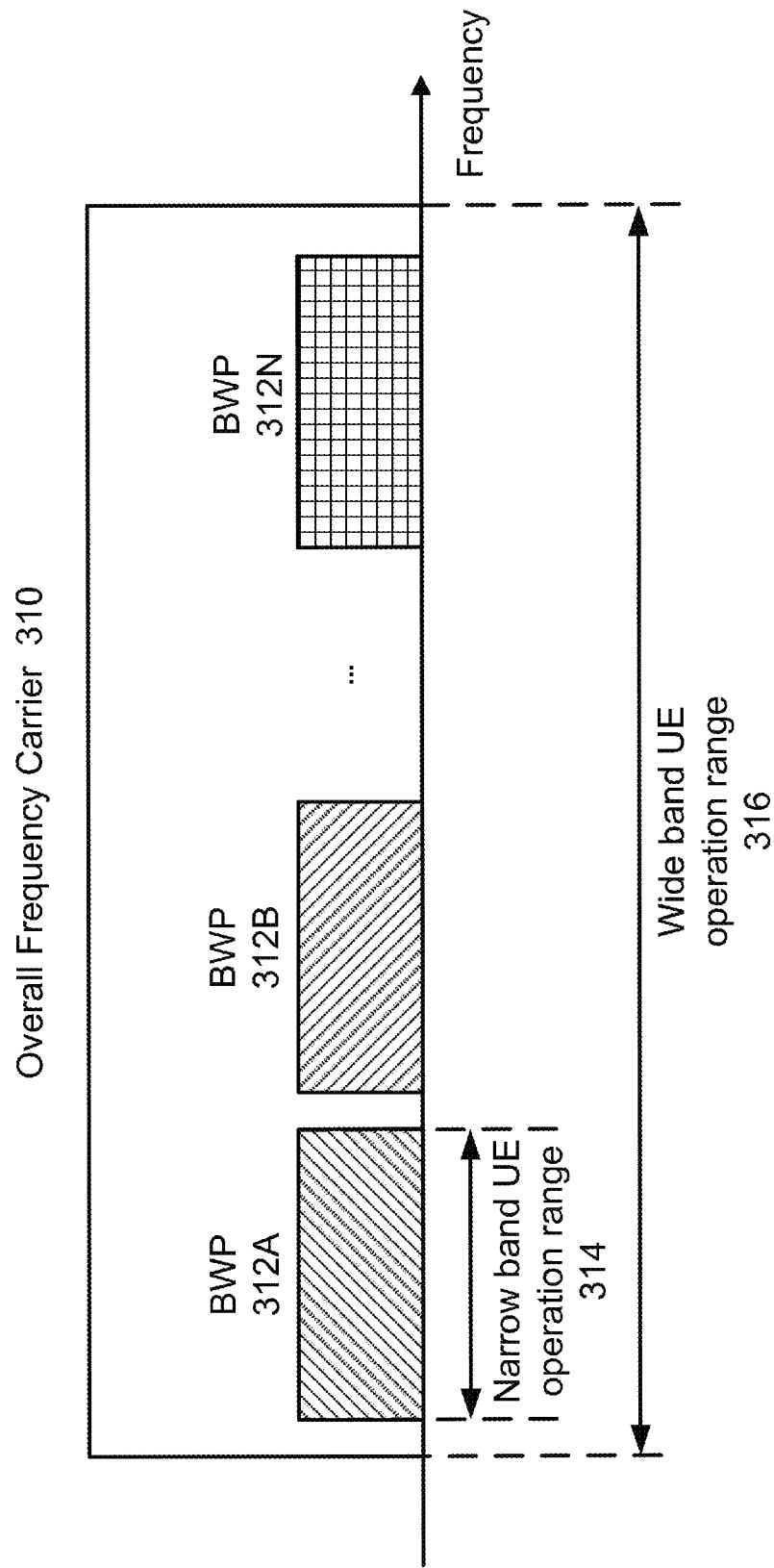
FIG. 3 is a diagram illustrating the relationship among UEs, bandwidth parts (BWPs), and the full bandwidth of a frequency carrier, according to an example implementation of the present application.

FIG. 3 is a diagram illustrating the relationship among UEs, BWPs, and the full bandwidth of a frequency carrier, according to an example implementation of the present application. As shown in FIG. 3, a frequency carrier 310 may include BWPs 312A, 312B, . . . 312N. A narrowband UE may have an operation range 314, while a wide band UE may have an operation range 316. Since the narrow band UEs may not receive the full bandwidth at the same time, they need to switch their hardware to receive different BWPs in the frequency carrier 310. Therefore, in addition to inter-carrier measurement, intra-carrier measurement gap also needs to be considered for the narrow band UEs.

Some implementations of the present application enable DL data transmission without grant from a base station, while a UE performs measurements on another carrier or BWP to ensure that the UE can receive DL data without grant during the measurement gap period. In some implementations, the base station may need to know on which carrier(s) or BWP(s) the UE will perform measurements during the measurement gap period. However, in the legacy (e)LTE networks, a measurement gap configuration and a measurement object configuration are unrelated. By contrast, implementations of the present application may provide explicit or implicit indication to establish a relationship between a measurement gap configuration and a measurement object configuration which includes frequency information such as carrier frequency(ies) and BWP(s). When the base station knows the carrier frequency(ies) or BWP(s) on which the UE is to perform measurements, the base station is able to send DL data without grant scheduling directly in the measurement object(s) on which the UE performs the measurements. In another implementation, a base station may send an indicator in the measurement object, on which the UE performs measurements, to notify the UE of the DL data on the original serving carrier/BWP, such that the UE may switch back to the original serving carrier/BWP to receive the DL data.

It is noted that, in some implementations of the present application, the measurement objects for URLLC UEs (e.g., UEs subscribing URLLC services) are operating under the same base station. In some implementations, the base station may use a Medium Access Control-control element (MAC-CE) to further activate or de-activate the measurement objects configured through RRC signaling for the constraint that all the measurement objects for URLLC UEs are operating under the same base station.

In some implementations, when the base station sends DL data without grant directly in the measurement object(s) during the UE's measurement gap period while the UE is performing inter-carrier/BWP measurements, the base station may send a preemption indication after the UE's measurement gap period in the UE's serving carrier/BWP to notify the UE about the data included in the received packet(s) during the measurement gap period.

Figure 4:
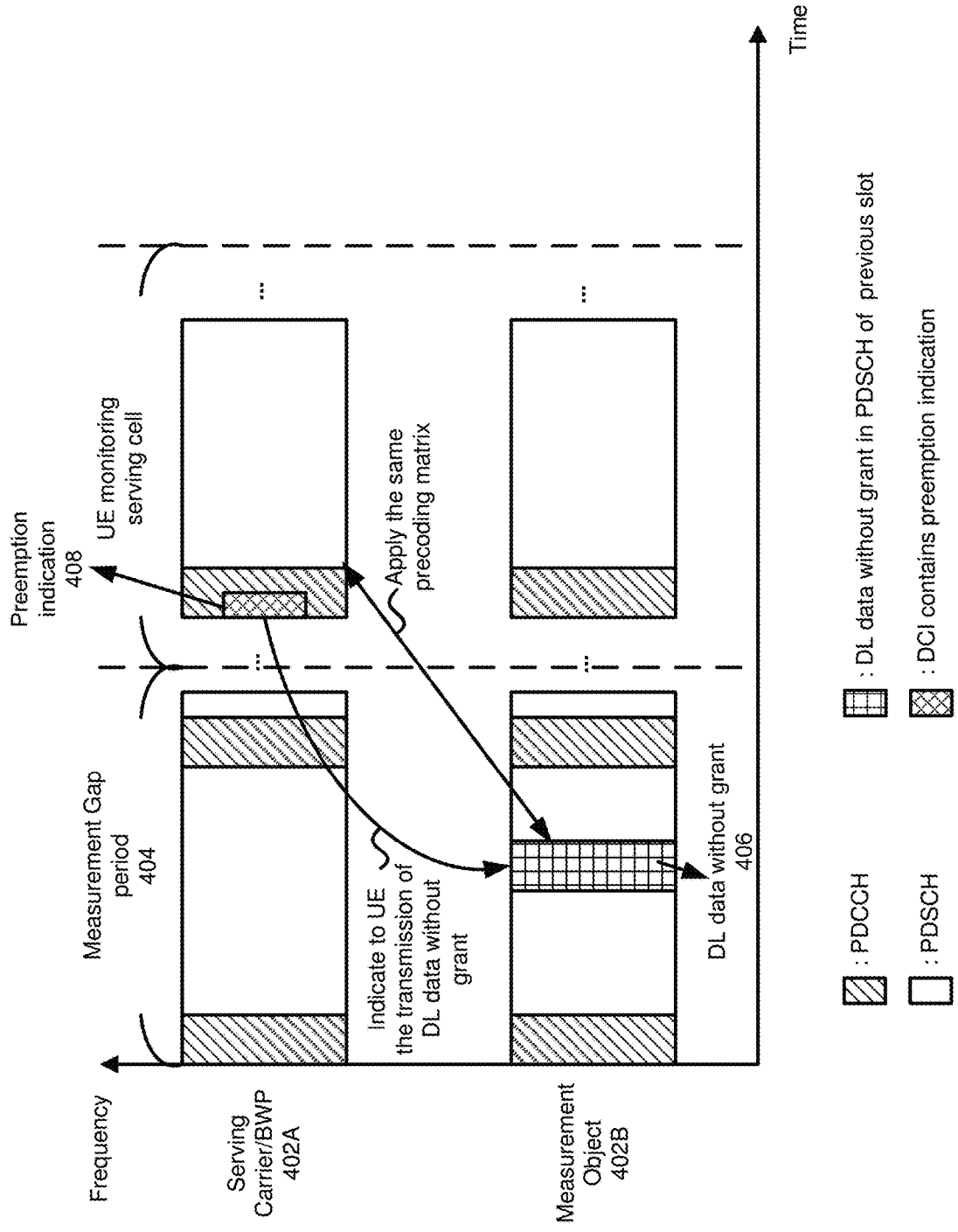
FIG. 4 is a diagram illustrating DL data without grant transmitted during a measurement gap period and a preemption indication with a measurement configuration, according to an example implementation of the present application.

FIG. 4 is a diagram illustrating DL data without grant transmitted during a measurement gap period and a preemption indication with a measurement configuration, according to an example implementation of the present application. In the present implementation, a UE establishes communication (e.g., data communication) with a base station in a serving carrier/BWP 402A. As shown in FIG. 4, during a measurement gap period 404, the UE may switch to a measurement object 402B to take measurement. During the measurement gap period 404, the base station may transmit, and the UE may receive, DL data without grant 406 over a PDSCH in the measurement object 402B.

When the UE switches back to the serving carrier/BWP 402A, the UE may monitor the serving cell of the serving carrier/BWP 402A, and receive a preemption indication 408 contained in DCI over a PDCCH, where the preemption indication 408 indicates to the UE the transmission of DL data without grant 406 in the measurement object 402B. By using the preemption indication 408 contained in DCI, the UE may decode and obtain the DL data without grant 406 received in the measurement object 402B during the measurement gap period 404. It is noted the measurement gap length configured by the base station for a URLLC service may be shorter than the measurement gap length for an eMBB service to ensure that the UE can fulfill the requirement of URLLC with DL data without grant during the measurement gap period. Furthermore, the base station may apply the same precoding matrix for the DL data without grant 406 in the measurement object 402B as the first slot that UE receives in the serving carrier/BWP 402A after the UE finishes performing measurements, or in the slot where the UE receives the preemption indication 408. As such, the UE can decode the DL data without grant 406 directly without requiring additional demodulation information as shown in FIG. 4. In another implementation, the preemption indication 408 may contain demodulation information, such as the precoding matrix or the demodulation RS pattern for decoding the DL data without grant 406.

In some implementations of the present application, a base station may send one or more indicators to a UE to notify the UE of the arrival of DL data on the original serving carrier/BWP during a measurement gap period. For example, a reference signal (RS) indicator may be configured in the measurement configuration, where the UE may monitor the additional RS during the measurement gap period when the measurement configuration includes an additional RS indicator configured in the measurement configuration. The RS sequence of the additional RS can be the same as a reference signal used by the UE in the serving base station. For example, the additional RS may reuse the same sequence of demodulation reference signal (DMRS), channel state information reference signal (CSI-RS), primary synchronization signal (PSS) or secondary synchronization signal (SSS). Moreover, to reduce signaling overhead, the location of the additional RS may be preconfigured by the specification or has a fix offset relative to a synchronization signal (SS) block contained in the measurement object.

Figure 5:
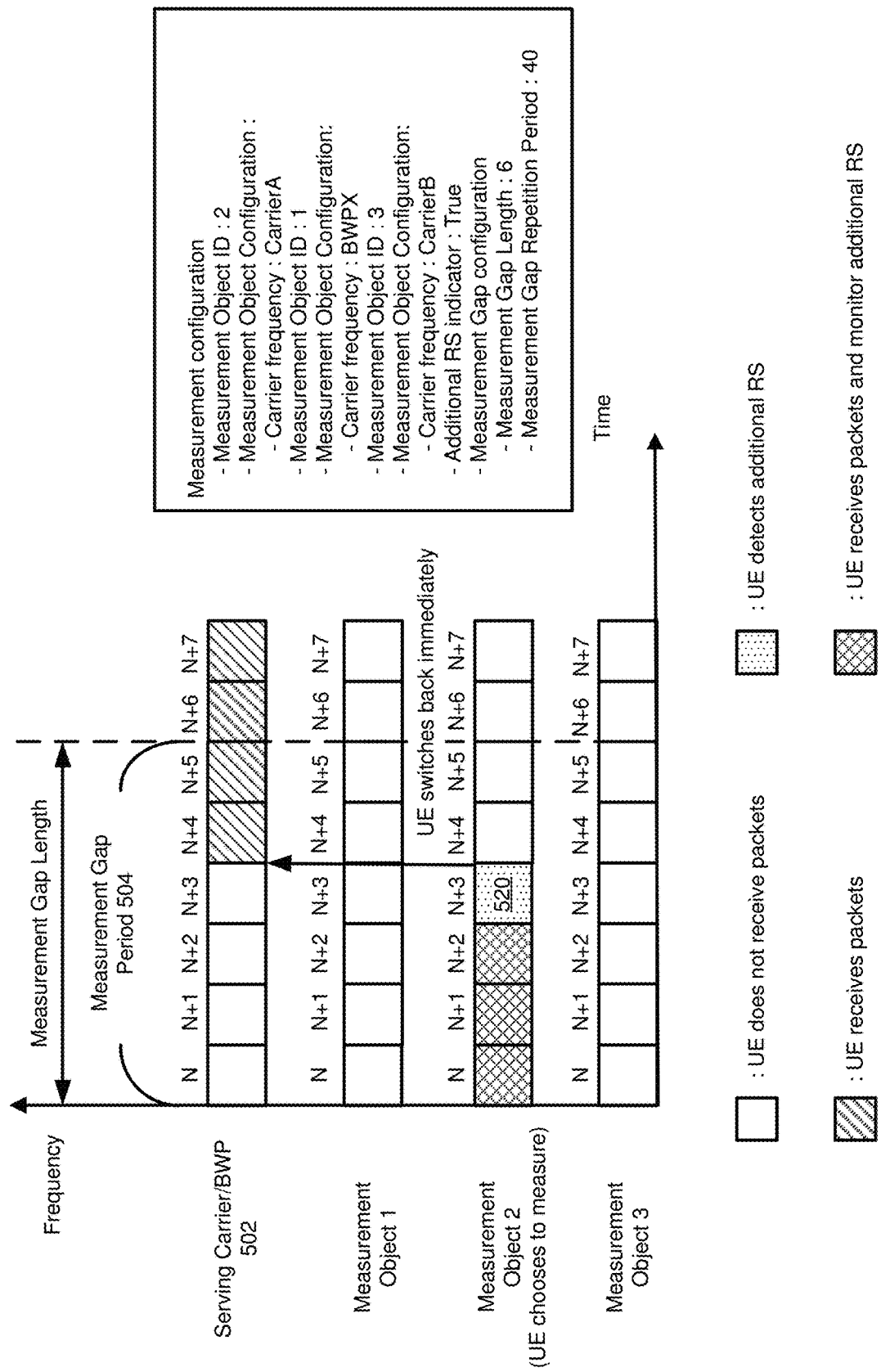
FIG. 5 is a diagram illustrating transmission of an additional RS to notify a UE of URLLC data during a measurement gap period and an additional RS indicator contained in a measurement configuration, according to an example implementation of the present application.

FIG. 5 is a diagram illustrating transmission of an additional RS to notify a UE of URLLC data during a measurement gap period and an additional RS indicator contained in a measurement configuration, according to an example implementation of the present application. As shown in FIG. 5, the UE may monitor additional RS(s) during a measurement gap period 504 when the measurement configuration includes an additional RS indicator set as "True". As shown in FIG. 5, in the present implementation, since the UE detects an additional RS 520 in the measurement object 2 in the time slot$_{N+3}$, the UE immediately switches back to its original serving carrier/BWP 502 and monitors the next time slot (e.g., slot$_{N+4}$) for DCI to receive the URLLC data on the serving carrier/BWP 502. It should be noted that, during the measurement gap period 504, the UE may choose any of the measurement objects 1, 2, and 3 to take measurements.

Figure 6:
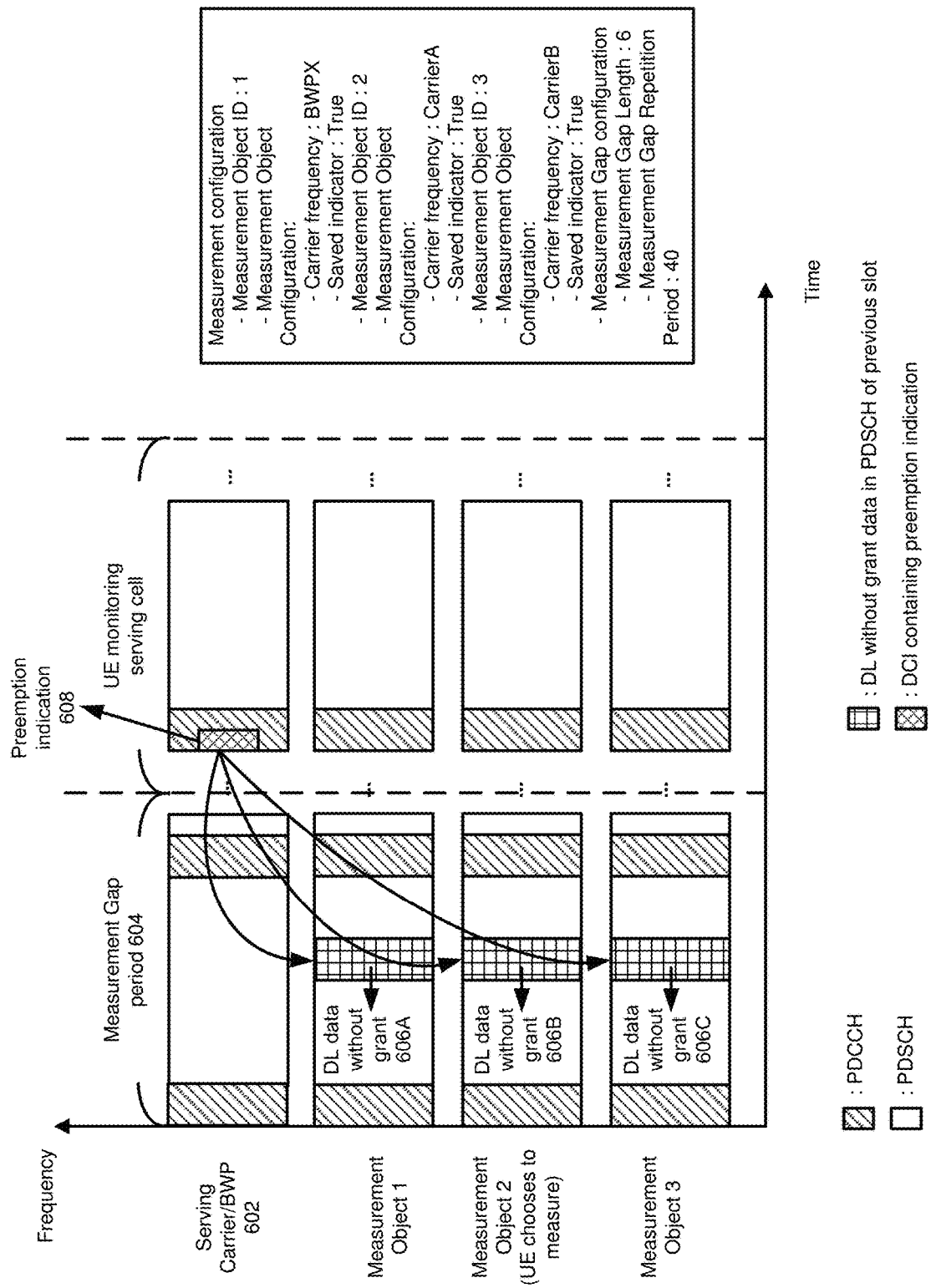
FIG. 6 is a diagram illustrating a base station transmitting DL data without grant to all measurement objects configured to a UE during a measurement gap period based on a measurement configuration, according to an example implementation of the present application.

FIG. 6 is a diagram illustrating a base station transmitting DL data without grant to all measurement objects configured to a UE during a measurement gap period based on a measurement configuration, according to an example implementation of the present application. In the present implementation, the UE saves all received packets from all measurement objects (e.g., measurement objects 1, 2, and 3 in FIG. 6) during a measurement gap period 604 in a soft buffer because the received packet(s) may contain DL data. For example, the UE saves DL data without grant 606A in a measurement object 1, DL data without grant 606B in a measurement object 2, and DL data without grant 606C in a measurement object 3, in the soft buffer. After the UE switches back to its serving carrier/BWP 602, the base station sends a preemption indication 608 to the UE, for example, in a GC-DCI. When the UE receives the preemption indication 608, the UE may decode the packets saved in the soft buffer to obtain the DL data. Otherwise, the UE may discard the packets. It is noted that the preemption indication

608 may contain scheduling information (e.g., time and frequency resource allocation information) of the DL data without grant, where the scheduling information is the same for all measurement objects.

Figure 7:
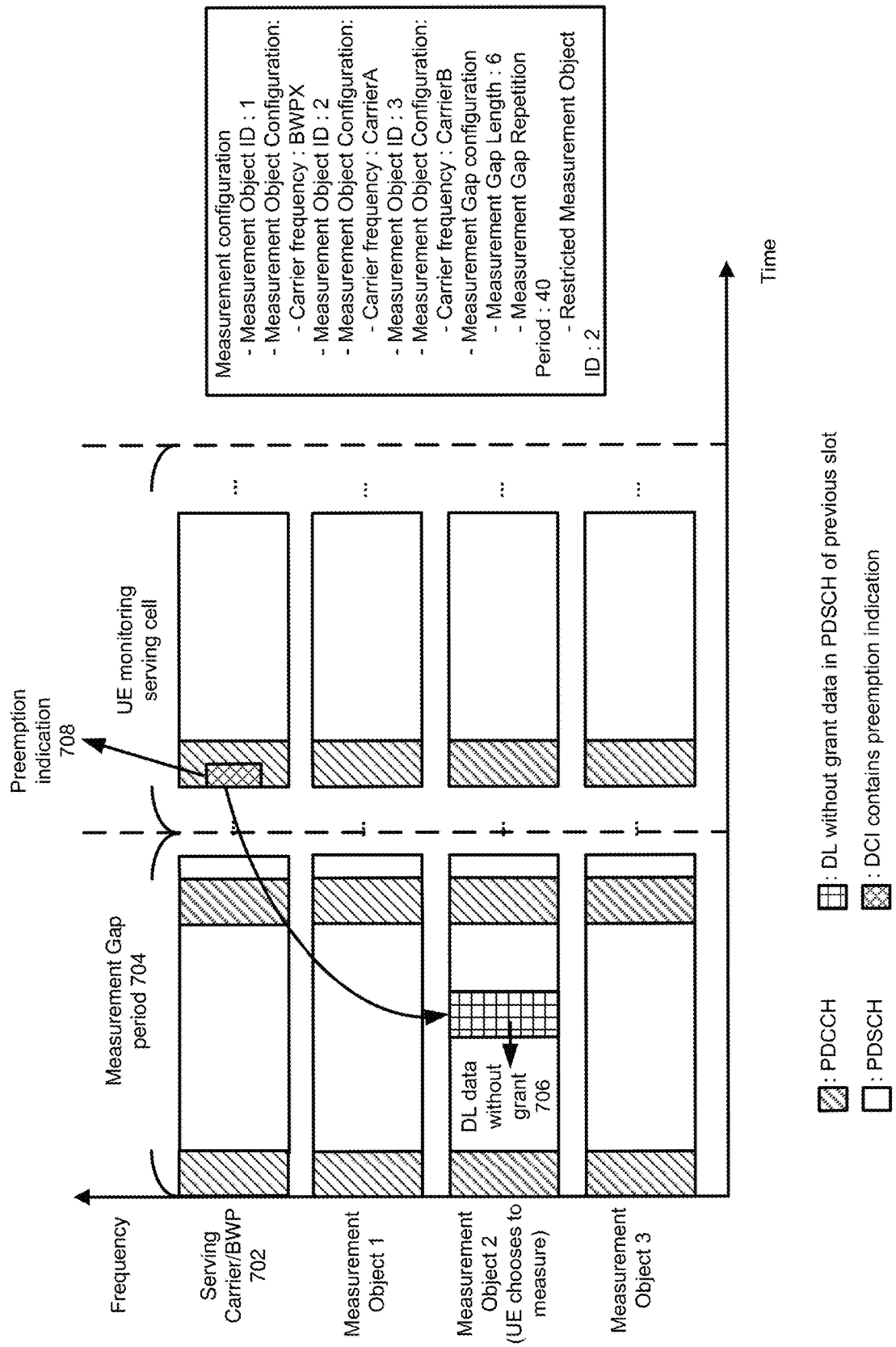
FIG. 7 is a diagram illustrating a base station transmitting DL data without grant to one or more measurement objects configured to a UE during a measurement gap period based on a measurement configuration having an information element indicating one or more restricted/selected measurement object identifiers (IDs), according to an example implementation of the present application.

FIG. 7 is a diagram illustrating a base station transmitting DL data without grant to one or more measurement objects configured to a UE during a measurement gap period based on a measurement configuration having an information element (IE) indicating one or more restricted/selected measurement object IDs, according to an example implementation of the present application. In the present implementation, the UE only needs to monitor the measurement object(s) indicated by the restricted/selected measurement object ID(s) in the measurement gap configuration. When URLLC data arrives during a measurement gap period 704, the base station transmits the URLLC data in the restricted/selected measurement object(s) indicated by the restricted/selected measurement object ID(s). For example, based on the restricted/selected measurement object ID(s) in the measurement gap configuration, the UE receives and saves DL data without grant 706 (within the total/entire slot) in the measurement object 2 (e.g., indicated by the restricted/selected measurement object ID: 2 in the measurement gap configuration) in a soft buffer. Hence, the UE may decode the packet(s) after receiving a preemption indication 708 in its serving carrier/BWP 702 to obtain the DL data without grant 706. It is noted that the selected/restricted measurement object ID(s) can be contained in DCI or through other higher layer signaling (e.g., MAC-CE or RRC signaling).

Figure 8:
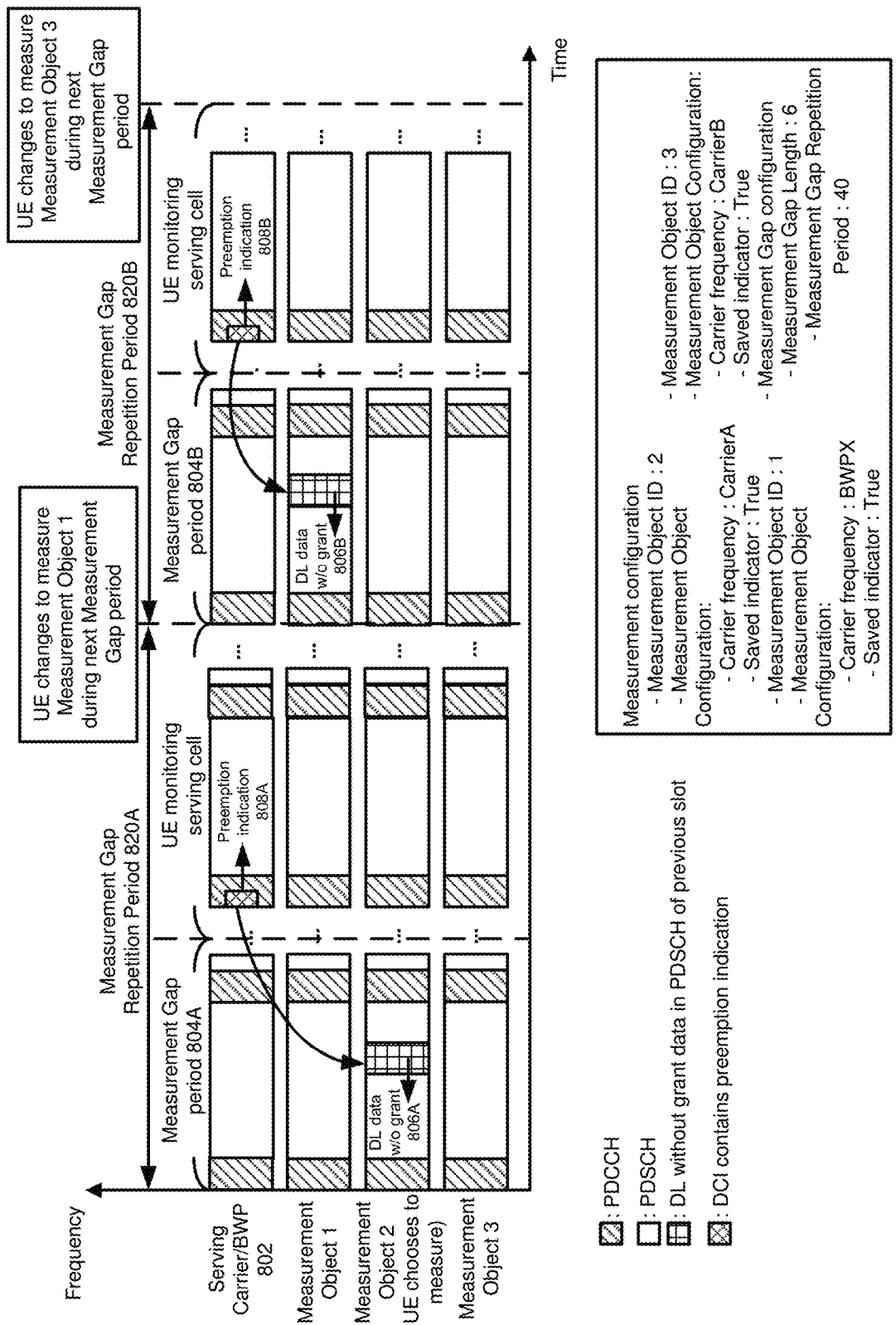
FIG. 8 is a diagram illustrating a base station transmitting DL data without grant to a measurement object in each measurement gap period following a predetermined order for the measurement gap periods, according to an example implementation of the present application.

FIG. 8 is a diagram illustrating a base station transmitting DL data without grant to a measurement object in each measurement gap period following a predetermined order for the measurement gap periods, according to an example implementation of the present application. FIG. 8 describes an implicit indication of a relationship between a measurement configuration and transmission(s) of DL data without grant. Because the UE follows the order specified in the measurement object configurations, the base station is able to know in which measurement object that the UE performs measurements for each measurement gap period. Therefore, the base station is able to transmit DL data to the corresponding measurement object during each measurement gap period. The base station then notifies the UE to decode the packet(s) received in each measurement gap period by a preemption indication.

As shown in FIG. 8, in a measurement gap repetition period 820A, because the UE follows the order of the measurement object configurations listed in the measurement configuration, the base station knows that the UE performs measurements in a measurement object 2 in a measurement gap period 804A. Thus, the base station transmits DL data without grant 806A to the measurement object 2 during the measurement gap period 804A. When the UE switches back to its serving carrier/BWP 802, the base station then notifies the UE to decode the DL data without grant 806A by a preemption indication 808A. In the next measurement gap repetition period 820B (e.g., in a measurement gap period 804B), because the UE follows the order of the measurement object configurations specified in the measurement configuration, the base station knows that the UE performs measurements in a measurement object 1 in a measurement gap period 804B. Thus, the base station transmits DL data without grant 806B to the measurement object 1 during the measurement gap period 804B. When the UE switches back to its serving carrier/BWP 802, the base station then notifies the UE to decode the DL data without grant 806B by a preemption indication 808B.

Furthermore, for the methods described in FIGS. 6-8, the UE saves the received packet(s) in the soft buffer during the measurement gap period(s), an indicator may be utilized in each of the measurement object configurations to notify the UE which one of the methods and the corresponding reception action may be implemented. The saved indicator configured in each of the measurement object configurations is shown in FIGS. 6 and 8. On the other hand, for the method shown in FIG. 7, with direct data transmission and the additional RS(s) for notification, the UE may save received packet(s) because there are already some additional configuration in the measurement configuration. In another implementation, a UE that subscribes for URLLC service may automatically save all received packet(s) during the measurement gap period(s) without the saved indicator.

It should be noted that the measurement gap length and repetition period may vary for various methods described herein. In some implementations, the values of the measurement gap length and repetition period may depend on how many measurement objects are to be measured within a single measurement gap.

Figure 9:
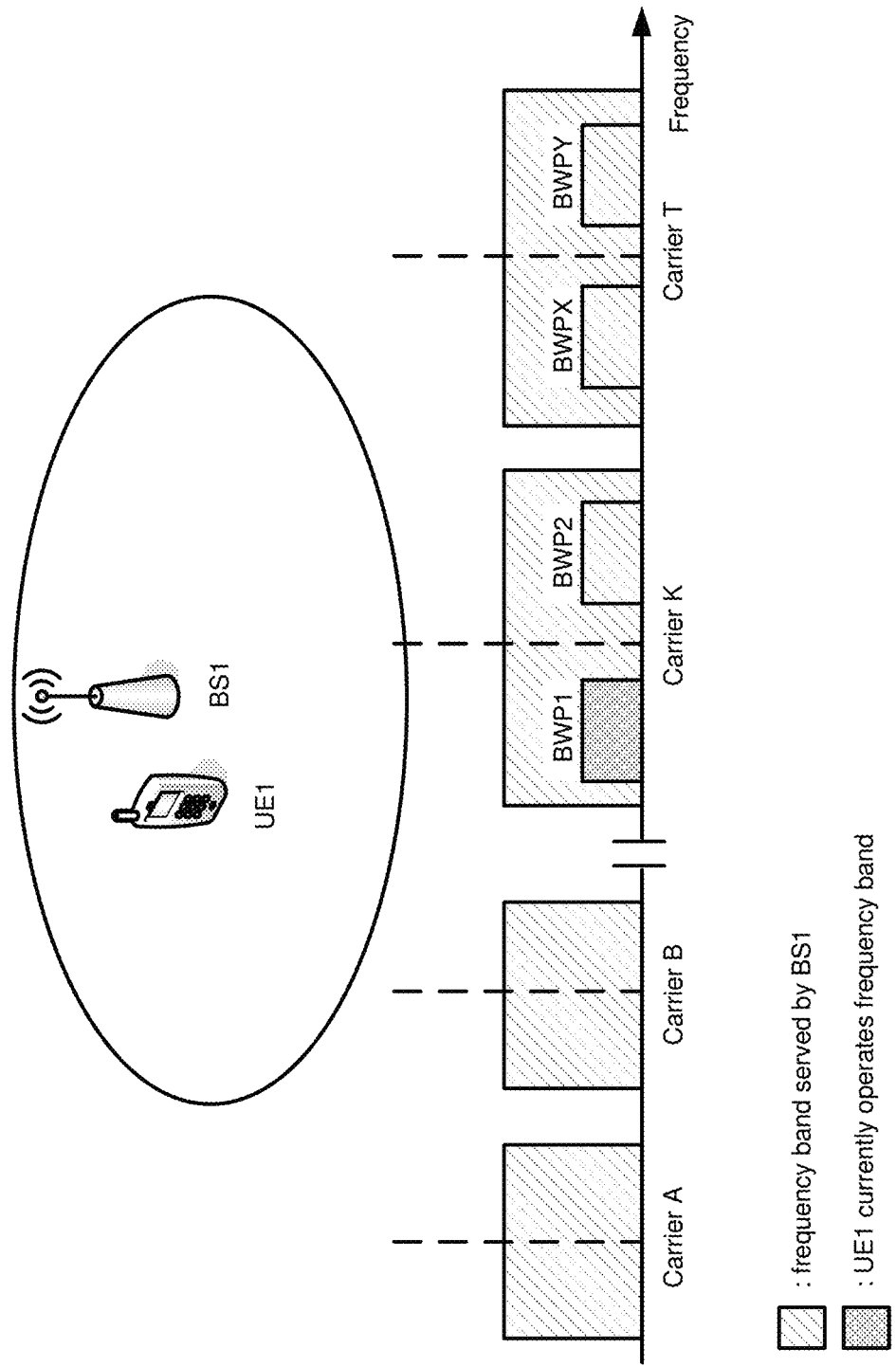
FIG. 9 is a diagram illustrating a network at an initial access state before a measurement gap period, according to an example implementation of the present application.

FIG. 9 is a diagram illustrating a network at an initial access state before a measurement gap period, according to an implementation of the present application. As shown in FIG. 9, a base station (e.g., a BS1) may communicate with one or more UEs (e.g., a UE1) using one or more frequency bands (e.g., Carriers A, B, K, T, etc.). Some carriers have one or more BWPs. For example, Carrier K includes $BWP_1$ and $BWP_2$, while Carrier T includes $BWP_X$ and $BWP_Y$. As shown in FIG. 9, at the initial access state, the UE1 is operating on $BWP_1$ of Carrier K.

Figure 10:
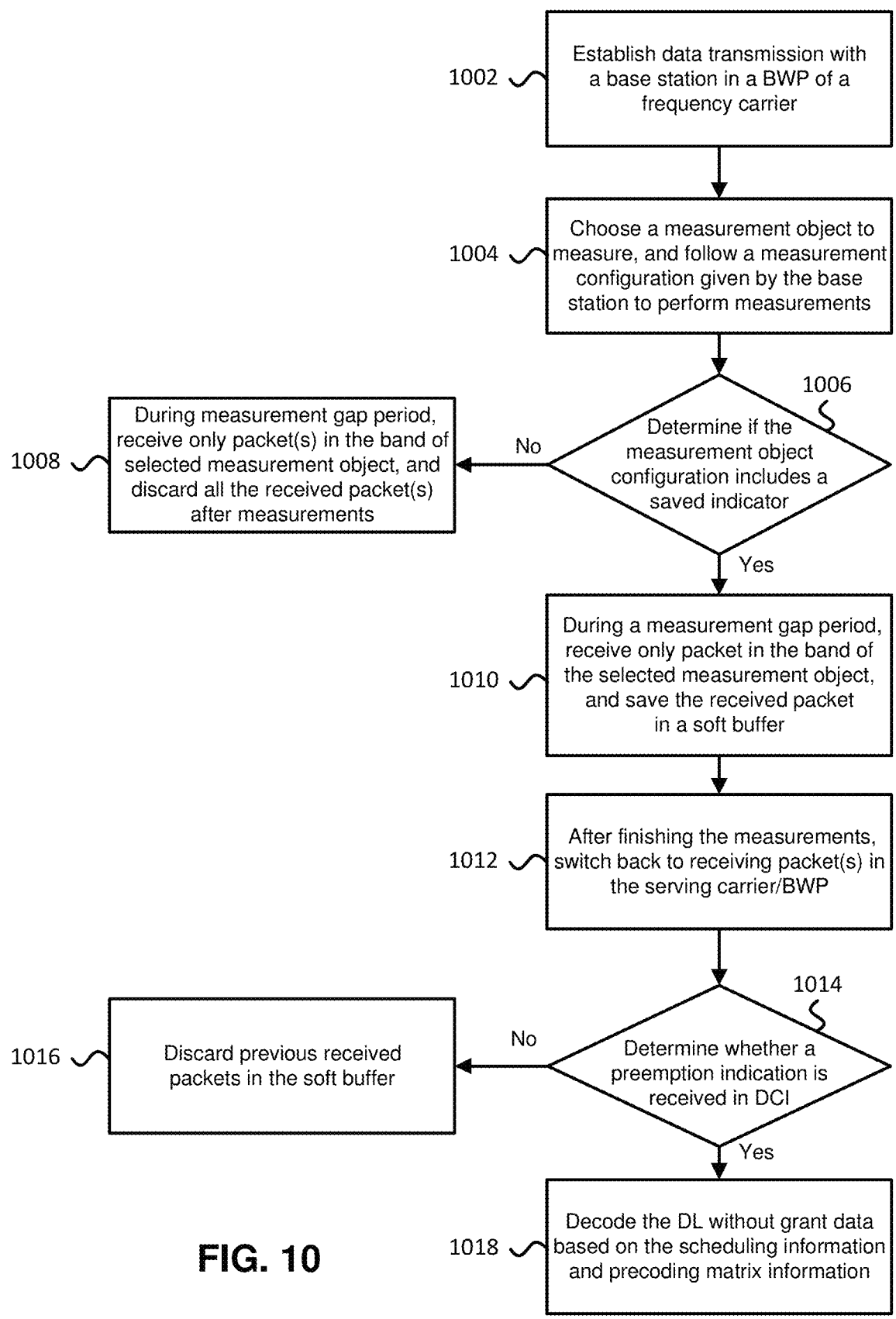
FIG. 10 is a flowchart of a method by a UE, according to an example implementation of the present application.

FIG. 10 is a flowchart of a method by a UE, according to an example implementation of the present application.

In action 1002, after an initial access state, a UE (e.g., a narrow band device) establishes data transmission with a base station in a BWP of a frequency carrier. For example, with reference to FIG. 9, the UE1 establishes data transmission with the BS1 in a $BWP_1$ of a serving carrier, Carrier K.

In action 1004, the UE chooses a measurement object to measure, and follows a measurement configuration from the base station to perform measurements. For example, with reference to FIG. 9, the BS1 configures measurement object configurations, for example, containing frequency information of inter-carrier frequency band(s) and/or intra-carrier BWP(s) in a measurement configuration to the UE1 through higher layer signaling (e.g., RRC signaling). The measurement configuration also includes a measurement gap configuration which contains a measurement gap length (MGL) and a measurement gap repetition period (MGRP), as illustrated in FIG. 6. The UE1 may choose a measurement object (e.g., measurement object 2) to measure, and follow the measurement configuration from the BS1.

In action 1006, the UE determines whether the measurement object configuration includes a saved indicator. If the outcome of the determination in action 1006 is Yes, then the flowchart proceeds to action 1010, where the UE follows the instruction(s) of the saved indicator in the measurement object configuration. For example, when the saved indicator indicates Yes, then the UE receives only packet(s) in the band (e.g., a carrier or a BWP) of the selected measurement object, and saves the received packet(s) in a soft buffer, during the measurement gap period. For example, with reference to FIG. 9, the UE1 may perform inter-carrier or inter-BWP measurements during the measurement gap period in action 1010, and save the received packets in the soft buffer during the measurement gap period based on the instruction of the saved indicator in the measurement object configuration. The UE1 may decide which of the measurement objects to measure by itself. For example, if the UE1 chooses to measure Carrier A during the first measurement gap period, then the UE1 has to switch its hardware to measure Carrier A. Thus, the UE1 may not receive the serving carrier/BWP (e.g., Carrier K or $BWP_1$) during the measurement gap period.

If the outcome of the determination in action 1006 is No (e.g., the measurement object configuration does not include a saved indicator), then the flowchart proceeds to action 1008, where the UE receives only packet(s) in the band of selected measurement object, and discards all the received packet(s) during the measurement gap period after the measurements.

In action 1012, after the measurements, the UE switches back to receiving packet(s) in the serving carrier. For example, with reference to FIG. 9, after the UE1 finishes performing the measurements, the UE1 may switch back to the serving carrier/BWP (e.g., Carrier K or $BWP_1$).

In action 1014, the UE determines whether it receives a preemption indication after decoding DCI in the serving carrier/BWP. If the outcome of the determination in action 1014 is Yes, then the flowchart proceeds to action 1018, where the UE decodes the DL data without grant based on the scheduling information and precoding matrix information contained in the preemption indication. For example, with reference to FIG. 9, the UE1 may use the scheduling information contained in the preemption indication to find the DL data without grant scheduling in the previously received packet(s) in Carrier A during the measurement gap period. As mentioned previously, the precoding matrix of DL data without grant may be known to the UE1 after the UE1 receives a DMRS in Carrier K. Based on the DMRS and the scheduling information, the UE1 is able to successfully decode the DL data without grant scheduling in the packet that the UE1 saved in the soft buffer during the measurement gap period. If the outcome of the determination in action 1014 is No, then the flowchart proceeds to action 1016, where the UE discards the previously received packet(s) in the soft buffer.

Figure 11:
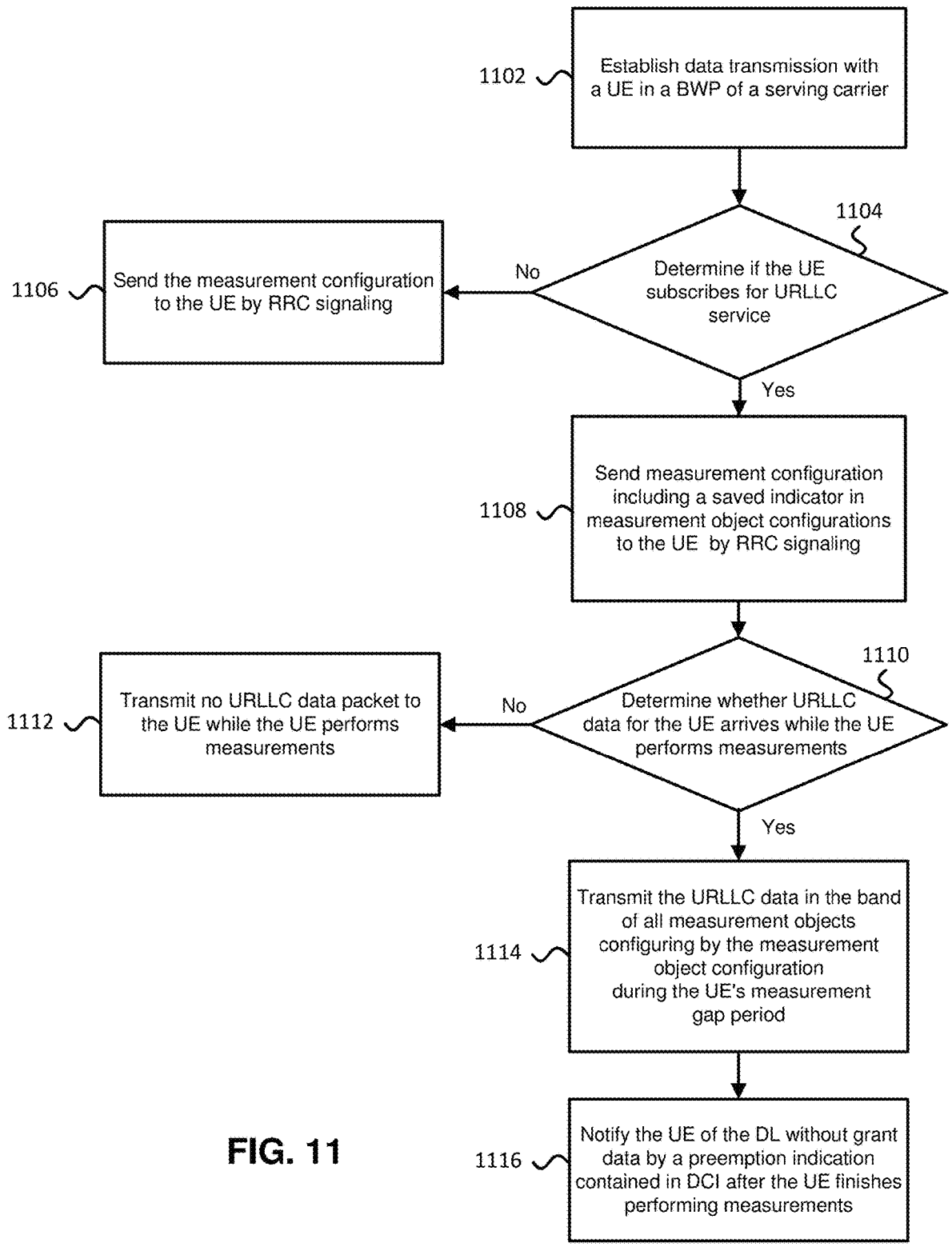
FIG. 11 is a flowchart of a method by a base station, according to an example implementation of the present application.

FIG. 11 is a flowchart of a method by a base station, according to an example implementation of the present application. In FIG. 11, inter-carrier or inter-BWP measurement with direct data transmission in all measurement objects is illustrated.

In action 1102, after an initial access state, a base station establishes data transmission with a UE in a BWP of a frequency carrier. For example, with reference to FIG. 9, the BS1 establishes data transmission with the UE1 in $BWP_1$ of Carrier K. The BS1 may also configure measurement object configurations containing frequency information of inter-carrier frequency band(s) and/or intra-carrier BWP(s) in a measurement configuration to the UE1 through higher layer signaling (e.g., RRC signaling). The measurement configuration may also include a measurement gap configuration which contains an MGL and an MGRP, as illustrated in FIG. 6.

In action 1104, the base station determines whether the UE subscribes for URLLC service.

If the outcome of the determination in action 1104 is No (e.g., the UE does not subscribe for URLLC service), then the base station sends the measurement configuration to the UE by RRC signaling in action 1106.

If the outcome of the determination in action 1104 is Yes, then the flowchart proceeds to action 1108, where the base station sends a measurement configuration including a saved indicator in each of the measurement object configurations to the UE by RRC signaling. For example, with reference to FIG. 9, if the UE1's subscription for URLLC service is successful (Yes in action 1104), the BS1 sends a measurement configuration including a saved indicator in each of the measurement object configurations to the UE1 by RRC signaling in action 1108.

In action 1110, the base station determines whether URLLC data for the UE arrives while the UE performs measurements during the measurement gap period.

If the outcome of the determination in action 1110 is Yes, then the flowchart proceeds to action 1114, where the base station transmits the URLLC data in band(s) of all measurement objects configured by the measurement object configurations during the UE's measurement gap period. For example, with reference to FIG. 9, if URLLC data for the UE1 arrives at the BS1 during the UE1's measurement gap period, the BS1 may send the URLLC data to all carriers and/or BWPs which are indicated by the measurement object configurations in action 1114.

In action 1116, the base station notifies the UE of the DL data without grant by a preemption indication contained in DCI after the UE finishes performing the measurements. In one implementation, with reference to FIG. 9, although the DL data without grant is sent repetitively to the UE1 in different BWPs and/or carriers, the data may apply the same precoding matrix. Also, the precoding matrix is the same as the precoding matrix of a DMRS contained in the first slot of the serving carrier/BWP (e.g., Carrier K or $BWP_1$) which the UE1 receives after the UE1 finishes the measurements. In another implementation, the preemption indication may contain demodulation information, such as, the precoding matrix or the demodulation RS pattern for the DL data without grant. The UE1 may demodulate the DL data without grant based on the demodulation information.

If the outcome of the determination in action 1110 is No (e.g., URLLC data for the UE does not arrive at the base station during the UE's measurement gap period), then the flowchart proceeds to action 1112, where the base station does not transmit any URLLC data packet to the UE while the UE performs the measurements.

Figure 12:
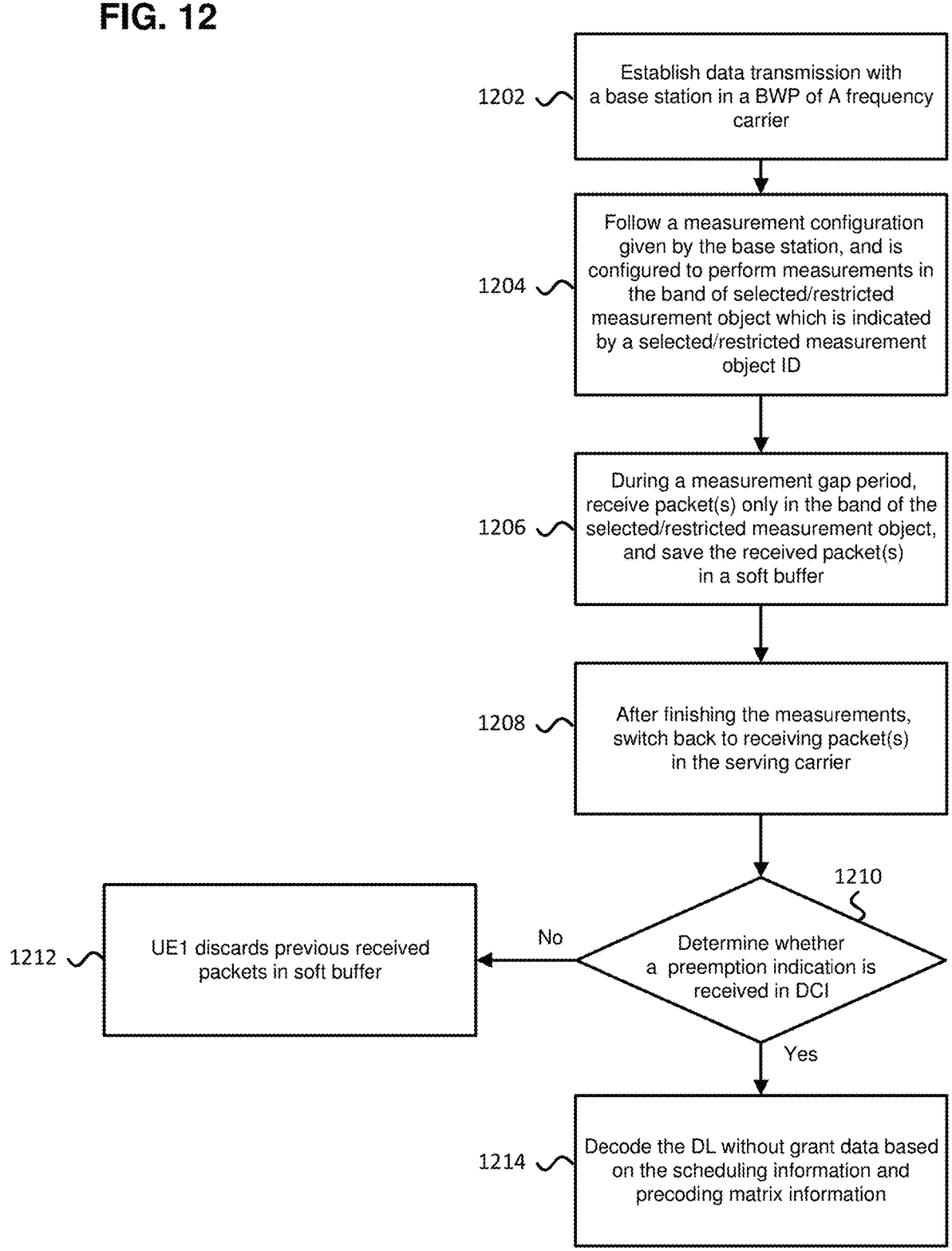
FIG. 12 is a flowchart of a method by a UE, according to an example implementation of the present application.

FIG. 12 is a flowchart of a method by a UE, according to an example implementation of the present application. In FIG. 12, inter-carrier or inter-BWP measurement with direct data transmission in measurement objects by explicit indication is illustrated.

In action 1202, after an initial access state, a UE (e.g., a narrow band device) establishes data transmission with a base station in a bandwidth part of a frequency carrier. For example, with reference to FIG. 9, the UE1 establishes data transmission with the BS1 in $BWP_1$ of Carrier K.

In action 1204, the UE follows a measurement configuration given by the base station, and is configured to perform measurements in the band (e.g., a BWP or a carrier) of a restricted/selected measurement object that is indicated by a restricted/selected measurement object ID in the measurement configuration. For example, with reference to FIG. 9, the BS1 configures a measurement object configuration containing frequency information of inter-carrier frequency band(s) and/or intra-carrier BWP(s) in the measurement configuration to the UE1 through higher layer signaling (e.g., RRC signaling). The measurement configuration also includes a measurement gap configuration which contains an MGL, an MGRP and a selected/restricted measurement object ID, as illustrated in FIG. 7.

In action 1206, during a measurement gap period, the UE receives packet(s) only in the band (e.g., a BWP or a carrier) of the selected/restricted measurement object, and saves the received packet(s) in a soft buffer. For example, with reference to FIG. 9, the UE1 performs inter-carrier or inter-BWP measurements during the measurement gap period. The UE1 measures only the band (e.g., a BWP or a carrier) of the selected/restricted measurement object indicated by the selected/restricted measurement object ID, and saves the received packet(s) during the measurement gap period because of the selected/restricted measurement object ID in the measurement object configuration (e.g., the selected/restricted measurement object ID is an implicit saved indicator to inform the UE to save the received packet(s) in the band corresponding to the selected/restricted measurement object). For example, with reference to FIGS. 7 and 9, the UE1 measures Carrier A during the measurement gap period 704 because the selected/restricted measurement object ID is 2. As the UE1 switches its hardware to measure Carrier A, the UE1 may not receive the carrier/BWP (e.g., Carrier K or $BWP_1$) at the same time. Before the next measurement gap (e.g., the second measurement gap), the BS1 may configure another selected/restricted measurement object ID by using DCI or through higher layer signaling (e.g., MAC-CE or RRC) to change the selected/restricted measurement object ID (e.g., the selected/restricted measurement object ID is 3). Then, the UE1 switches its hardware accordingly and may not receive on the serving carrier/BWP (e.g., Carrier K or $BWP_1$). It is noted that a bitmap may be used, such that the Nth bit being set to "1" indicates that the corresponding the Nth measurement object configuration is selected/restricted.

In action 1208, after finishing the measurements, the UE switches back to receiving packet(s) in the serving carrier. For example, with reference to FIGS. 7 and 9, after the UE1 finishes performing the measurements, the UE1 may switch back to the serving carrier/BWP (e.g., Carrier K or $BWP_1$).

In action 1210, the UE determines whether it receives a preemption indication after decoding DCI in the serving carrier.

If the outcome of the determination in action 1210 is Yes, then the flowchart proceeds to action 1214, where the UE decodes the DL data without grant based on the scheduling information and precoding matrix information contained in the preemption indication. For example, with reference to FIG. 9, if the UE1 receives a preemption indication after decoding the DCI in action 1210, in action 1214, the UE1 may use the scheduling information contained in the preemption indication to find the DL data without grant scheduled in the previously received packet(s) in Carrier A during the measurement gap period. As mentioned previously, the precoding matrix of DL data without grant may be known after the UE1 receives a DMRS in Carrier K. Based on the DMRS and the scheduling information, the UE1 may successfully decode the DL data without grant received in the previously received packet(s) in the soft buffer during the measurement gap period. If the outcome of the determination in action 1210 is No, then the flowchart proceeds to action 1212, where the UE discards the previously received packet(s) in the soft buffer.

Figure 13:
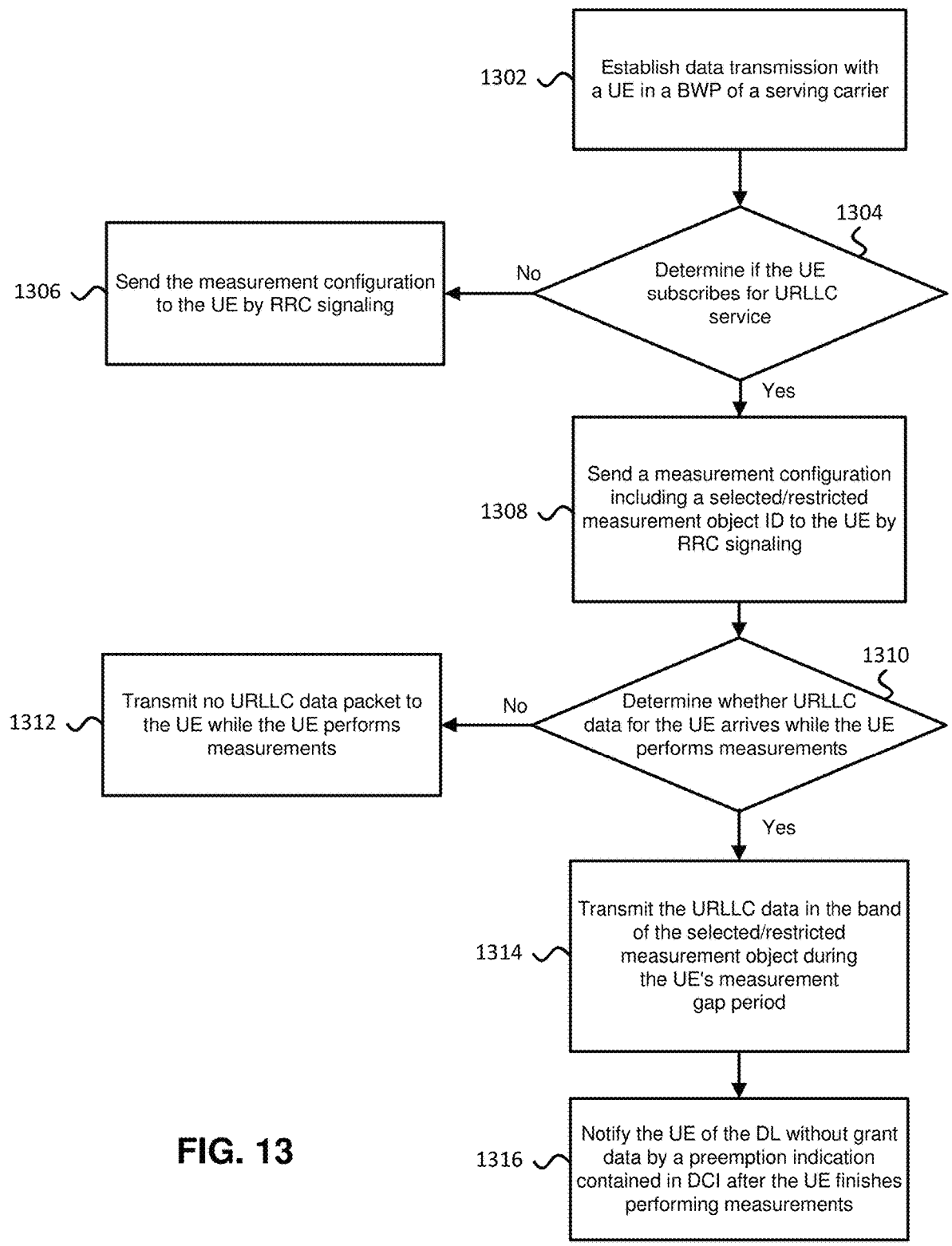
FIG. 13 is a flowchart of a method by a base station, according to an example implementation of the present application.

FIG. 13 is a flowchart of a method by a base station, according to an example implementation of the present application. In FIG. 13, inter-carrier or inter-BWP measurement with direct data transmission in one or more measurement objects by explicit indication is illustrated.

In action 1302, after an initial access state, a base station establishes data transmission with a UE in a BWP of a frequency carrier. For example, with reference to FIG. 9, the BS1 establishes data transmission with the UE1 in $BWP_1$ of Carrier K. The BS1 may also configure measurement object configurations containing frequency information of inter-carrier frequency band(s) and/or intra-carrier BWP(s) in a measurement configuration to the UE1 through higher layer signaling (e.g., RRC signaling). The measurement configuration may also include measurement gap configuration which contains an MGL and an MGRP, as illustrated in FIG. 7.

In action 1304, the base station determines whether the UE subscribes for URLLC service.

If the outcome of the determination in action 1304 is No (e.g., the UE does not subscribe for URLLC service), then the base station sends the measurement configuration to the UE by RRC signaling in action 1306.

If the outcome of the determination in action 1304 is Yes, then the flowchart proceeds to action 1308, where the base station sends a measurement configuration including one or more selected/restricted measurement object IDs to the UE by RRC signaling. For example, with reference to FIG. 9, if the UE1's subscription for URLLC service is successful (Yes in action 1304), the BS1 sends a measurement configuration including one or more selected/restricted measurement object IDs to the UE1 by RRC signaling in action 1308.

In action 1310, the base station determines whether URLLC data for the UE arrives while the UE performs measurements during the measurement gap period.

If the outcome of the determination in action 1310 is Yes, then the flowchart proceeds to action 1314, where the base station transmits the URLLC data in the measurement object indicated by the selected/restricted measurement object ID during the UE's measurement gap period. For example, with reference to FIG. 9, if URLLC data for the UE1 arrives at the BS1 during the UE1's measurement gap period, the BS1 may send the URLLC data only in the band (e.g., a BWP or a carrier) of the selected/restricted measurement object.

In action 1316, the base station notifies the UE of the DL data without grant by a preemption indication contained in DCI after the UE finishes performing the measurement. In one implementation, with reference to FIG. 9, the DL data without grant, in the measurement object indicated by the selected/restricted measurement object ID, may apply the same precoding matrix of a DMRS contained in the first slot of the serving carrier/BWP (e.g., Carrier K or $BWP_1$) which the UE1 receives after the UE1 finishes the measurement. In another implementation, the preemption indication may contain demodulation information, such as, the precoding matrix or the demodulation RS pattern for the DL data without grant. The UE1 may demodulate the DL data without grant based on the demodulation information.

If the outcome of the determination in action 1310 is No (e.g., URLLC data for the UE does not arrive at the base station during the UE's measurement gap period), then the flowchart proceeds to action 1312, where the base station does not transmit any URLLC data packet to the UE while the UE performs the measurement.

Figure 14:
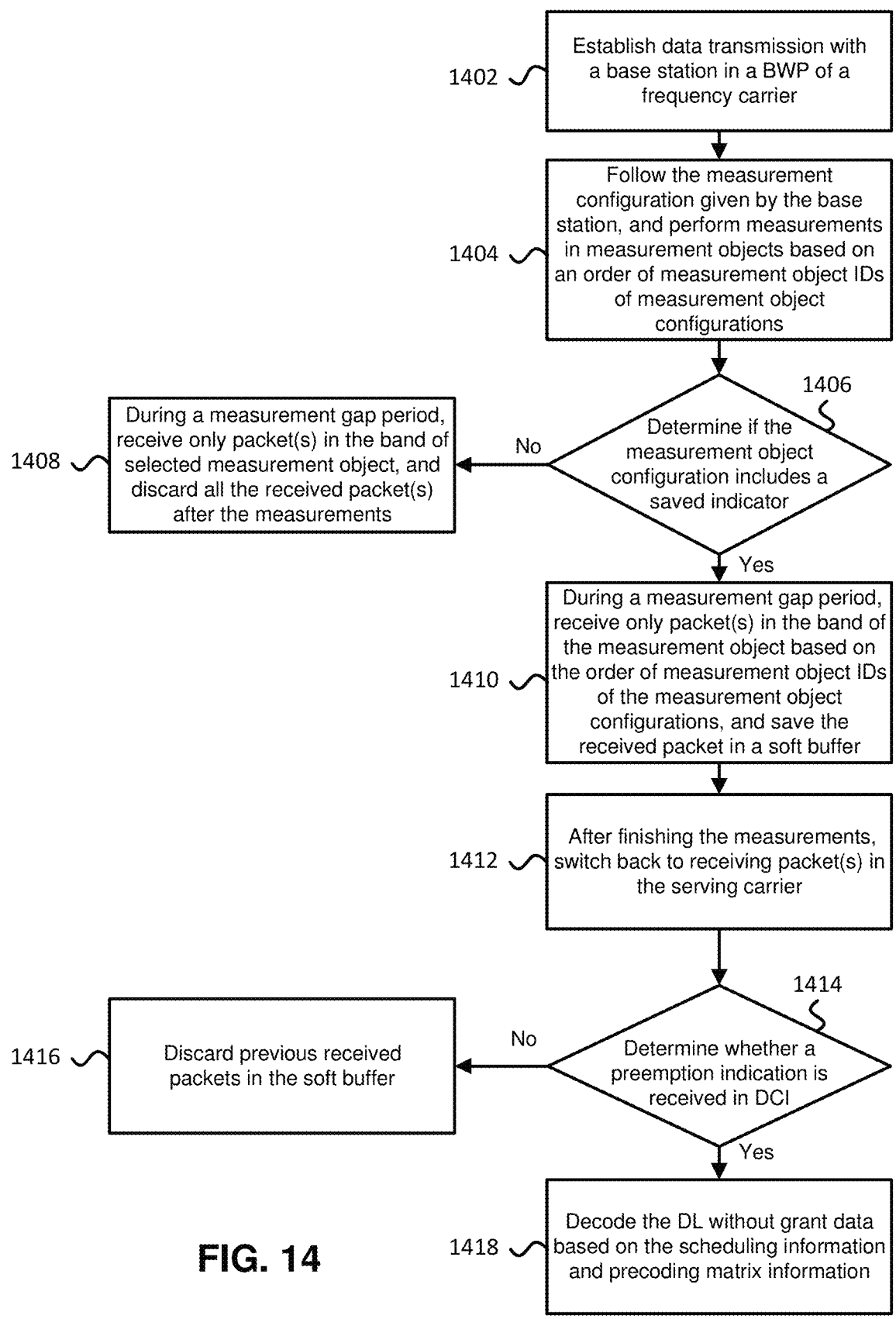
FIG. 14 is a flowchart of a method by a UE, according to an example implementation of the present application.

FIG. 14 is a flowchart of a method by a UE, according to an example implementation of the present application. In FIG. 14, inter-carrier or inter-BWP measurement with direct data transmission in measurement objects by implicit indication is illustrated.

In action 1402, after an initial access state, a UE (e.g., a narrow band device) establishes data transmission with a base station in a bandwidth part of a frequency carrier. For example, with reference to FIG. 9, the UE1 establishes data transmission with the BS1 in $BWP_1$ of Carrier K. The BS1 may configure measurement object configurations containing frequency information of inter-carrier frequency band(s) and/or intra-carrier BWP(s) in a measurement configuration to the UE1 through higher layer signaling (e.g., RRC signaling). The measurement configuration may also include measurement gap configuration which contains an MGL and an MGRP, as illustrated in FIG. 8.

In action 1404, the UE follows the measurement configuration given by the base station, and performs measurements in the measurement object based on the order of the measurement object IDs of the measurement object configurations in the measurement configuration.

In action 1406, the UE determines whether the measurement object configuration includes a saved indicator. If the outcome of the determination in action 1406 is Yes, then the flowchart proceeds to action 1410, where the UE performs measurements during a measurement gap period, and saves the received packet(s) during the measurement gap period based on the instruction(s) of the saved indicator in each of the measurement object configuration.

For example, with reference to FIGS. 8 and 9, the UE1 follows the order of measurement object IDs contained in the measurement configuration to determine in which measurement object that the UE1 may perform measurements during each measurement gap period. For example, because the order of measurement object ID in measurement configuration is 2, 1 and then 3, as shown in FIG. 8, the UE1 may perform measurements in Carrier A during the first measurement gap period, perform measurements in $BWP_x$ of Carrier T during the second measurement gap period, and so on. Because the UE1 has to switch its hardware to measure the measurement object(s), the UE1 may not receive the serving carrier/BWP (e.g., Carrier K or $BWP_1$) at the same time.

If the outcome of the determination in action 1406 is No (e.g., the measurement object configuration does not include a saved indicator), then the flowchart proceeds to action 1408, where the UE receives only packet(s) in the band of selected measurement object, and discards all the received packet(s) during the measurement gap period after the measurements.

In action 1412, after finishing the measurements, the UE switches back to receiving packet(s) in the serving carrier/BWP (e.g., Carrier K or $BWP_1$). For example, with reference to FIG. 9, after the UE1 finishes the measurement, the UE1 may switch back to the serving carrier/BWP (e.g., Carrier K or $BWP_1$).

In action 1414, the UE determines whether it receives a preemption indication after decoding DCI in the serving carrier. If the outcome of the determination in action 1414 is Yes, then the flowchart proceeds to action 1418, where the UE decodes the DL data without grant based on the scheduling information and precoding matrix information contained in the preemption indication. For example, with reference to FIG. 9, the UE1 may use the scheduling information contained in the preemption indication to find the DL data without grant scheduling in the previously received packet(s) in Carrier A during the measurement gap period. As mentioned previously, the precoding matrix of DL data without grant may be known to the UE1 after the UE1 receives a DMRS in Carrier K. Based on the DMRS and the scheduling information, the UE1 is able to successfully decode the DL data without grant scheduling in the packet that the UE1 saved in a soft buffer during the measurement gap period. If the outcome of the determination in action 1414 is No, then the flowchart proceeds to action 1416, where the UE discards the previously received packet(s) in the soft buffer.

Figure 15:
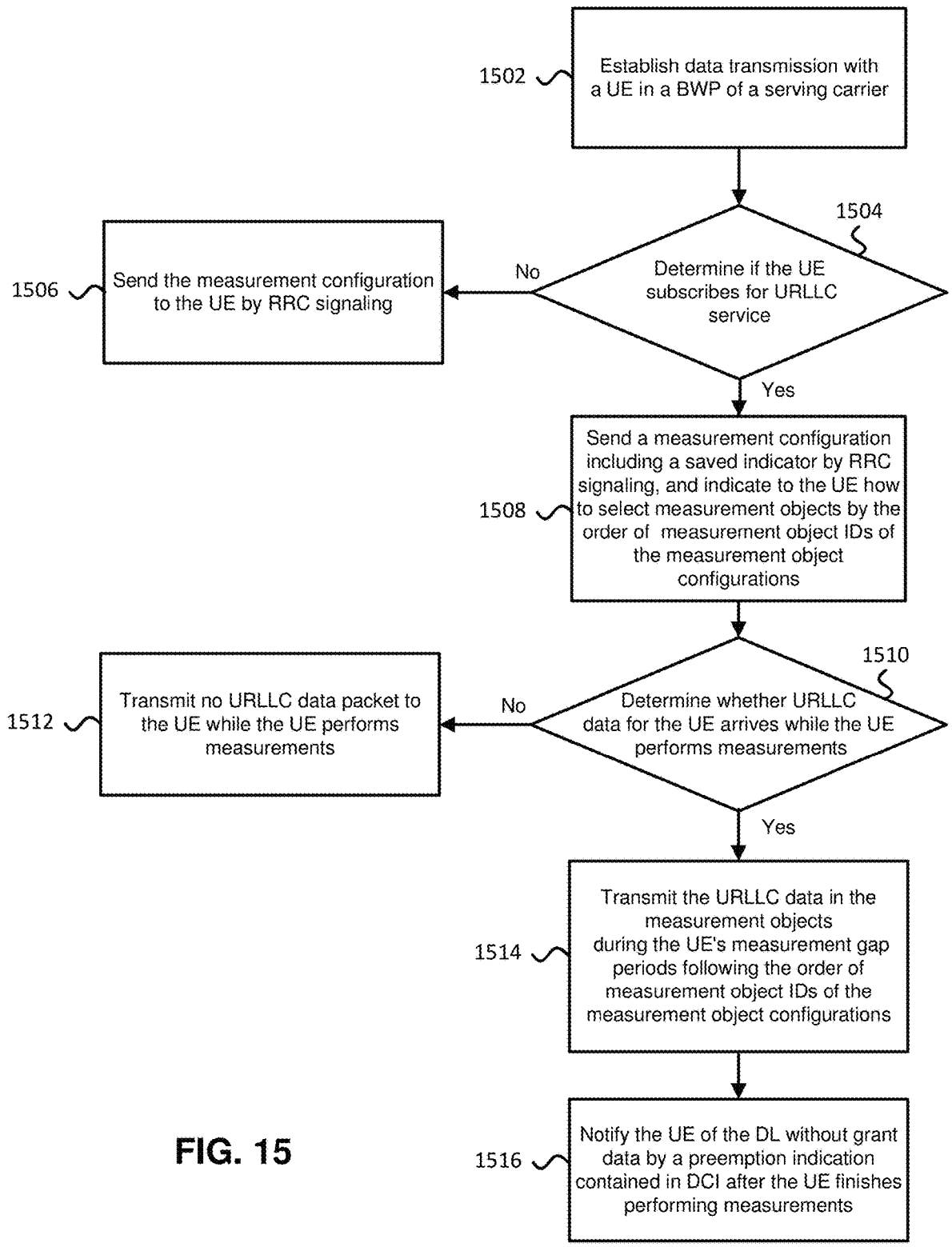
FIG. 15 is a flowchart of a method by a base station, according to an example implementation of the present application.

FIG. 15 is a flowchart of a method by a base station, according to an example implementation of the present application. In FIG. 15, inter-carrier or inter-BWP measurement with direct data transmission in measurement objects by implicit indication is illustrated.

In action 1502, after an initial access state, a base station establishes data transmission with a UE in a BWP of a frequency carrier. For example, with reference to FIG. 9, the BS1 establishes data transmission with the UE1 in $BWP_1$ of Carrier K. The BS1 may also configure measurement object configurations containing frequency information of inter-carrier frequency band(s) and/or intra-carrier BWP(s) in a measurement configuration to the UE1 through higher layer signaling (e.g., RRC signaling). The measurement configuration may also include a measurement gap configuration which contains an MGL and an MGRP, as illustrated in FIG. 8.

In action 1504, the base station determines whether the UE subscribes for URLLC service.

If the outcome of the determination in action 1504 is No (e.g., the UE does not subscribe for URLLC service), the base station sends the measurement configuration to the UE by RRC signaling in action 1506.

If the outcome of the determination in action 1504 is Yes, then the flowchart proceeds to action 1508, where the base station sends a saved indicator by RRC signaling, and indicates to the UE as to how to select measurement objects by the order of measurement object IDs of the measurement object configurations.

In action 1510, the base station determines whether URLLC data for the UE arrives while the UE performs measurements during the measurement gap period.

If the outcome of the determination in action 1510 is Yes, then the flowchart proceeds to action 1514, where the base station transmits the URLLC data in the measurement object following the order of measurement object IDs of the measurement object configurations during each of the UE's measurement gap periods.

In action 1516, the base station notifies the UE of the DL data without grant by a preemption indication contained in DCI after the UE finishes performing the measurement. Although the DL data without grant scheduling are sent repetitively to the UE in different BWPs and/or carriers, the data may apply the same precoding matrix. Also, the precoding matrix is the same as the precoding matrix of a DMRS contained in the first slot of the serving carrier/BWP (e.g., Carrier K or $BWP_1$) which the UE receives after the UE finishes the measurements. In another implementation, the preemption indication may contain demodulation information, such as, the precoding matrix or the demodulation RS pattern for the DL data without grant. The UE may demodulate the DL data without grant based on the demodulation information.

If the outcome of the determination in action 1510 is No (e.g., URLLC data for the UE does not arrive at the base station during the UE's measurement gap period), then the flowchart proceeds to action 1512, where the base station does not transmit any URLLC data packet to the UE while the UE performs the measurements.

Figure 16:
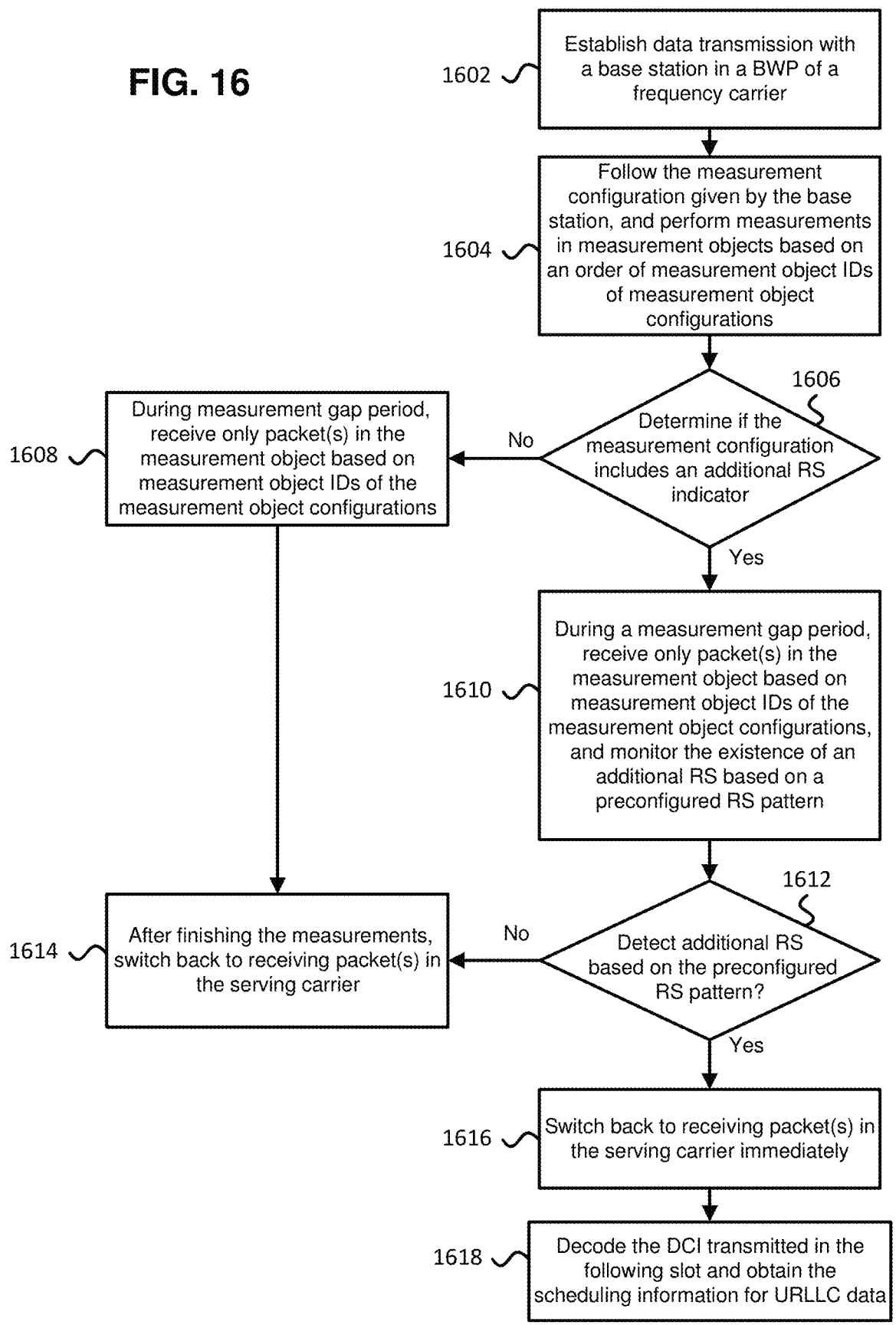
FIG. 16 is a flowchart of a method by a UE, according to an example implementation of the present application.

FIG. 16 is a flowchart of a method by a UE, according to an example implementation of the present application. In FIG. 16, inter-carrier or inter-BWP measurement with the indicator transmission in one or more measurement objects by implicit indication is illustrated.

In action 1602, after an initial access state, a UE (e.g., a narrow band device) establishes data transmission with a base station in a bandwidth part of a frequency carrier. For example, with reference to FIG. 9, the UE1 establishes data transmission with the BS1 in $BWP_1$ of a serving carrier, Carrier K. The BS1 may configure measurement object configurations containing frequency information of inter-carrier frequency band(s) and/or intra-carrier BWP(s) in a measurement configuration to the UE1 through higher layer signaling (e.g., RRC signaling). The measurement configuration may also include an additional RS indicator to notify UE to monitor the additional RS in each measurement object during the measurement gap period. The measurement configuration also includes a measurement gap configuration which contains an MGL and an MGRP, as illustrated in FIG. 5.

In action 1604, the UE follows the measurement configuration given by the base station, and perform measurements in measurement objects based on an order of measurement object IDs of measurement object configurations. With reference to FIGS. 5 and 9, the UE1 may perform inter-carrier or inter-BWP measurements during a measurement gap period, and try to detect the additional RS in the received packet(s) during the measurement gap period due to the existence of the additional RS indicator in the measurement configuration. The UE1 follows the order of measurement object IDs contained in the measurement configuration to determine in which measurement objects the UE1 may perform measurements during each of the measurement gap period. For example, because the order of the measurement object IDs in the measurement configuration is 2, 1 and then 3, in FIG. 5, the UE1 may perform measurements in Carrier A during the first measurement gap period, perform measurements in $BWP_x$ of Carrier T at the second time measurement gap period, and so on. Because the UE1 has to switch its hardware to measure the measurement object(s), the UE1 may not receive the serving carrier/BWP (e.g., Carrier K or $BWP_1$) at the same time.

In action 1606, the UE determines whether the measurement configuration includes an additional RS indicator.

If the outcome of the determination in action 1606 is Yes, then the flowchart proceeds to action 1610, where the UE receives only packet(s) in the measurement object based on measurement object IDs of the measurement object configurations, and monitors the existence of additional RS based on a preconfigured RS pattern. For example, with reference to FIGS. 5 and 9, the UE1 may receive only the packet(s) in the measurement object based on measurement object IDs of the measurement object configurations, and monitors the existence of additional RS(s) based on a preconfigured RS pattern.

In action 1612, the UE determines whether it detects an additional RS based on the preconfigured RS pattern.

If the outcome of the determination in action 1612 is Yes, then the flowchart proceeds to action 1616, where the UE switches back to the serving carrier. In action 1618, the UE decodes the DCI transmitted in following slot and obtains the scheduling information for the URLLC data.

If the outcome of the determination in action 1606 is No, then the flowchart proceeds to action 1608, where the UE receives only the packet(s) in the measurement object based on the measurement object IDs of the measurement object configurations. Then, in action 1614, after the UE finishes the measurements, the UE switches back to receiving packets in the serving carrier. Also, if the UE does not detect any additional RS based on the preconfigured RS pattern in action 1612 (e.g., the outcome of the determination in action 1612 is No), then the UE switches back to receiving packets in the serving carrier.

Figure 17:
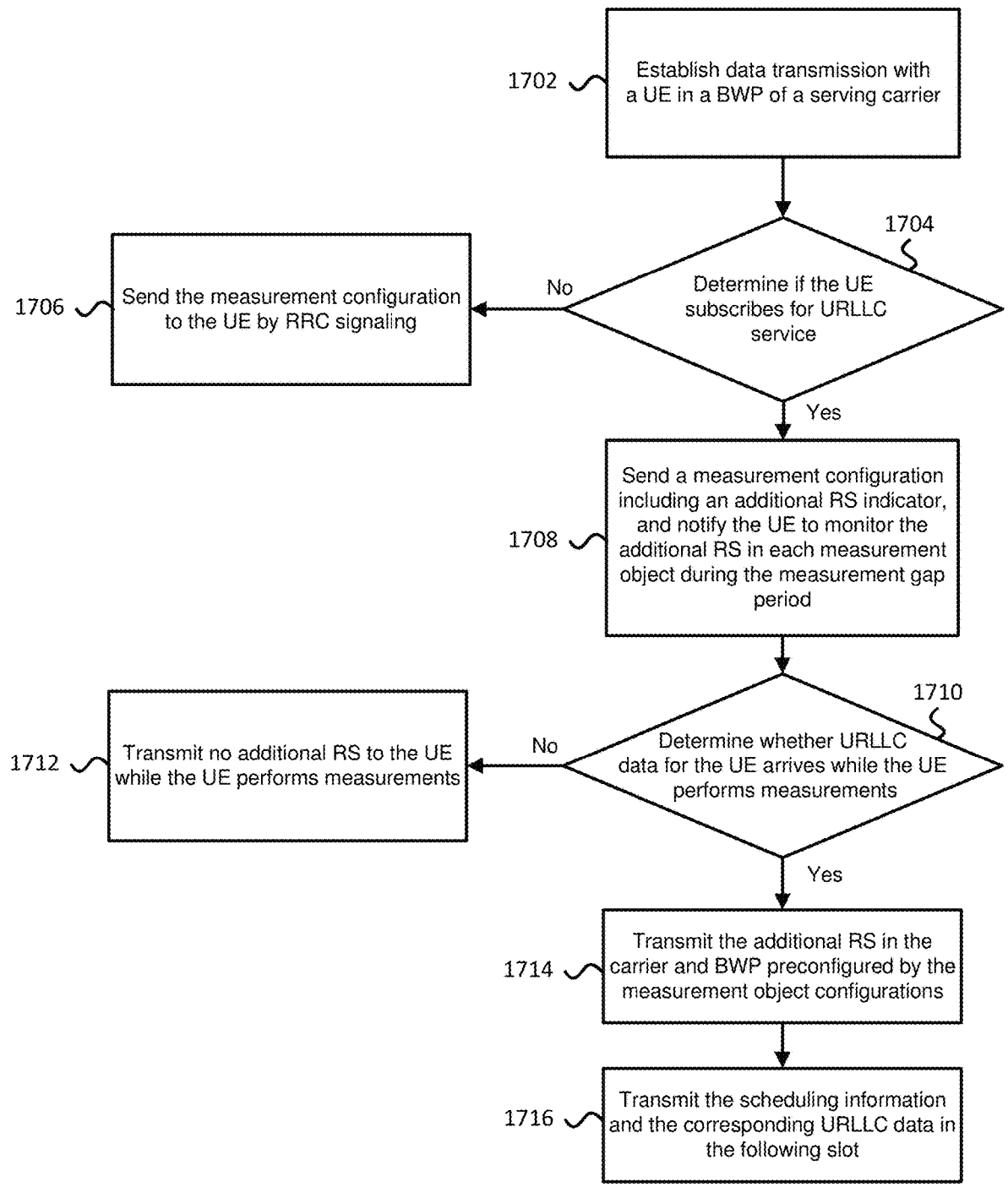
FIG. 17 is a flowchart of a method by a base station, according to an example implementation of the present application.

FIG. 17 is a flowchart of by a base station, according to an example implementation of the present application. In FIG. 17, inter-carrier or inter-BWP measurement with the indicator transmission in measurement objects by implicit indication is illustrated.

In action 1702, after an initial access state, the base station establishes data transmission with a UE in a bandwidth part of a frequency carrier. For example, with reference to FIG. 9, the BS1 establishes data transmission with the UE1 in $BWP_1$ of Carrier K.

In action 1704, the base station determines whether the UE subscribes for URLLC service.

If the outcome of the determination in action 1704 is No (e.g., the UE does not subscribe for URLLC service), the base station sends the measurement configuration to the UE by RRC signaling in action 1706.

If the outcome of the determination in action 1704 is Yes, then the flowchart proceeds to action 1708, where the base station configures a measurement object configuration containing frequency information of inter-carrier frequency band(s) and/or intra-carrier BWP(s) in the measurement configuration through higher layer signaling (e.g., RRC signaling). The measurement configuration also includes an additional RS indicator to notify the UE to monitor the additional RS in each measurement object during the measurement gap period. The measurement configuration also includes a measurement gap configuration which contains an MGL and an MGRP, as illustrated in FIG. 5.

In action 1710, the base station determines whether URLLC data for the UE arrives while the UE performs measurements during the measurement gap period.

If the outcome of the determination in action 1710 is Yes, then the flowchart proceeds to action 1714, where the base station transmits the additional RS in the carrier and BWP which are pre-configured by the measurement object configurations. During the measurement gap period, the UE may monitor for the existence of the additional RS based on a preconfigured RS pattern. If the UE detects the transmission of an additional RS, the UE switches back to its serving carrier/BWP (e.g., Carrier K or $BWP_1$) and decodes the following slot for DCI to obtain the scheduling information of URLLC data transmitted by the base station in action 1716. If the UE does not detect any additional RS, the UE may keep performing measurement till the end of the measurement gap period and then switch back to its serving carrier.

If the outcome of the determination in action 1710 is No (e.g., URLLC data for the UE does not arrive at the base station during the UE's measurement gap period), then the flowchart proceeds to action 1712, where the base station does not transmit any additional RS to the UE while the UE performs the measurement.

Figure 18:
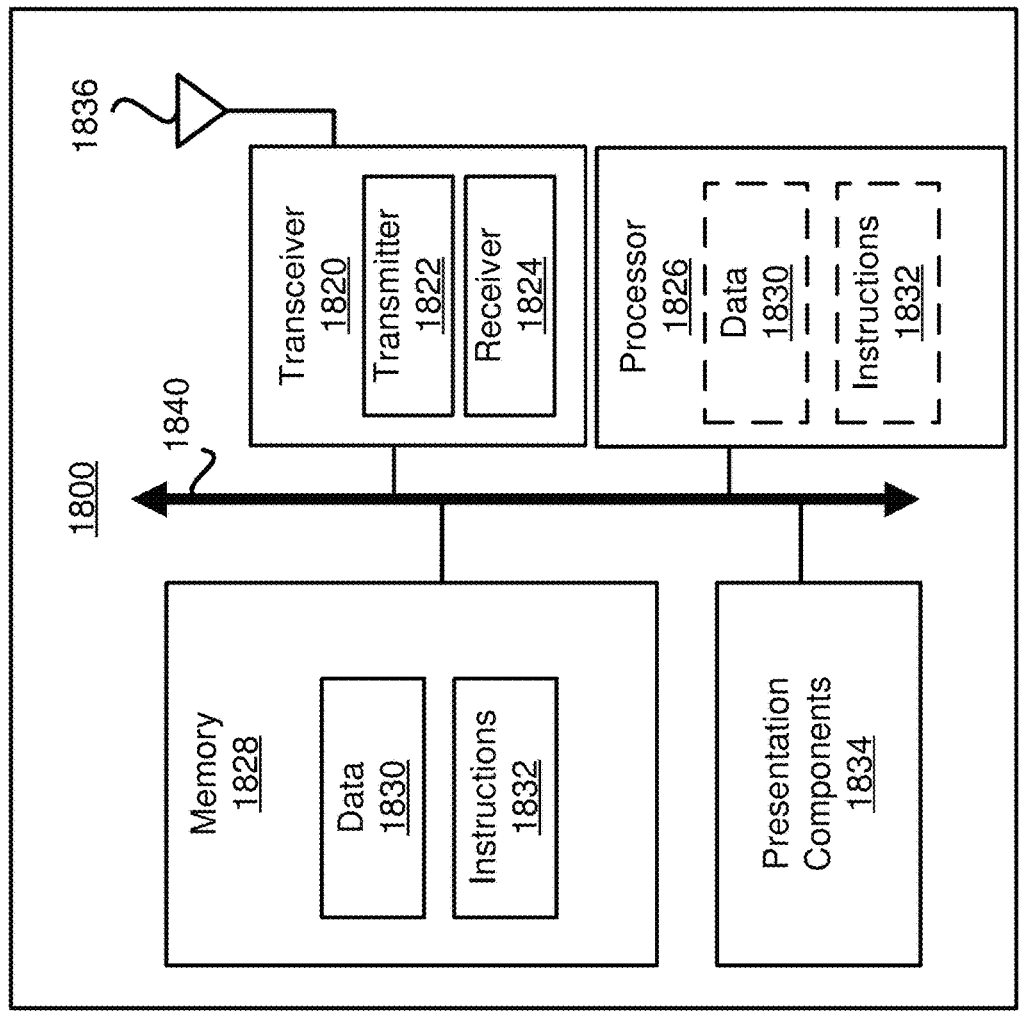
FIG. 18 is a block diagram illustrating a radio communication equipment, according to an example implementation of the present application.

FIG. 18 illustrates a block diagram of a node for wireless communication, in accordance with various aspects of the present application. As shown in FIG. 18, a node 1800 may include a transceiver 1820, a processor 1826, a memory 1828, one or more presentation components 1834, and at least one antenna 1836. The node 1800 may also include an RF spectrum band module, a base station communications module, a network communications module, and a system communications management module, input/output (I/O) ports, I/O components, and power supply (not explicitly shown in FIG. 18). Each of these components may be in communication with each other, directly or indirectly, over one or more buses 1840. In one implementation, the node 1800 may be a UE or a base station that performs various functions described herein, for example, with reference to FIGS. 1 through 17.

The transceiver 1820 having a transmitter 1822 (having transmitting circuitry) and a receiver 1824 (having receiving circuitry) may be configured to transmit and/or receive time and/or frequency resource partitioning information. In some implementations, the transceiver 1820 may be configured to transmit in different types of subframes and slots including, but not limited to, usable, non-usable and flexibly usable subframes and slot formats. The transceiver 1820 may be configured to receive data and control channels.

The node 1800 may include a variety of computer-readable media. Computer-readable media can be any available media that can be accessed by the node 1800 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1828 may include computer-storage media in the form of volatile and/or non-volatile memory. The memory 1828 may be removable, non-removable, or a combination thereof. Exemplary memory includes solid-state memory, hard drives, optical-disc drives, and etc. As illustrated in FIG. 18, The memory 1828 may store computer-readable, computer-executable instructions 1832 (e.g., software codes) that are configured to, when executed, cause the processor 1826 to perform various functions described herein, for example, with reference to FIGS. 1 through 17. Alternatively, the instructions 1832 may not be directly executable by the processor 1826 but be configured to cause the node 1800 (e.g., when compiled and executed) to perform various functions described herein.

The processor 1826 may include an intelligent hardware device, e.g., a central processing unit (CPU), a microcontroller, an ASIC, and etc. The processor 1826 may include memory. The processor 1826 may process the data 1830 and the instructions 1832 received from the memory 1828, and information through the transceiver 1820, the base band communications module, and/or the network communications module. The processor 1826 may also process information to be sent to the transceiver 1820 for transmission through the antenna 1836, to the network communications module for transmission to a core network.

One or more presentation components 1834 presents data indications to a person or other device. Exemplary presentation components 1834 include a display device, speaker, printing component, vibrating component, and etc.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method comprising:
   transmitting, by transmitting circuitry of a base station, downlink data to a user equipment (UE) in at least one of a plurality of measurement objects in a first frequency carrier during one of a plurality of measurement gap periods of the UE; and
   transmitting, by the transmitting circuitry, an indicator associated with the downlink data to the UE in a second frequency carrier and after the one of the plurality of measurement gap periods,
   wherein the indicator indicates at least one of time resource allocation information and frequency resource allocation information of the downlink data contained in the one of the plurality of measurement objects.

2. The method of claim 1, wherein the at least one of the plurality of measurement objects comprises every measurement object in the plurality of measurement objects.

3. The method of claim 1, further comprising:
   transmitting, by the transmitting circuitry, a measurement object configuration to the UE, the measurement object configuration containing a list of measurement object identifiers (IDs) identifying a measurement object for each of the plurality of measurement gap periods,
   wherein transmitting the downlink data to the UE comprises transmitting the downlink data in the one of the plurality of measurement objects identified in the list during the one of the plurality of measurement gap periods.

4. The method of claim 1, further comprising:
   transmitting, by the transmitting circuitry, a measurement object configuration to the UE, the measurement object configuration containing an order by which the UE is to perform measurement using the plurality of measurement objects in the plurality of measurement gap periods,
   wherein transmitting the downlink data to the UE comprises transmitting the downlink data in the one of the plurality of measurement objects in the one of the plurality of measurement gap periods based on the order.

5. The method of claim 4, wherein the order is based on one of:
   measurement object IDs identifying a corresponding measurement object for each of the plurality of measurement gap periods; and
   an explicitly configured order for each of the plurality of measurement gap periods.

6. The method of claim 1, wherein the indicator is included in downlink control information (DCI) in the second frequency carrier.

7. The method of claim 1, wherein the indicator includes demodulation information for decoding the downlink data.

8. The method of claim 1, further comprising:
applying a precoding matrix to the downlink data, wherein the precoding matrix is the same as that of a reference signal contained in a first slot transmitted to the UE in the second frequency carrier after the one of the plurality of measurement gap periods.

9. The method of claim 1, further comprising:
transmitting, by the transmitting circuitry, a measurement object configuration containing a saved data indicator to the UE, wherein
when the saved data indicator indicates YES, the UE saves the downlink data in a soft buffer after the one of the plurality of measurement gap periods, and
when the saved data indicator indicates NO, the UE discards the downlink data after the one of the plurality of measurement gap periods.

10. The method of claim 1, wherein the transmitting the downlink data to the UE in the first frequency carrier comprises transmitting the downlink data without grant to the UE and while the UE is taking measurement during one of the plurality of measurement gap periods on the second frequency carrier.

11. A method comprising:
receiving, by receiving circuitry of a user equipment (UE), downlink data in one of a plurality of measurement objects in a first frequency carrier during one of a plurality of measurement gap periods; and
receiving, by the receiving circuitry, an indicator associated with the downlink data in a second frequency carrier after the one of the plurality of measurement gap periods,
wherein the indicator indicates at least one of time resource allocation information and frequency resource allocation information of the downlink data contained in the one of the plurality of measurement objects.

12. The method of claim 11, further comprising:
receiving, by the receiving circuitry, a measurement object configuration, the measurement object configuration containing a list of measurement object identifiers (IDs) identifying a measurement object for each of the plurality of measurement gap periods,
wherein receiving the downlink data comprises receiving the downlink data in the one of the plurality of measurement objects identified in the list during the one of the plurality of measurement gap periods.

13. The method of claim 11, further comprising:
receiving, by the receiving circuitry, a measurement object configuration, the measurement object configuration containing an order by which the UE is to perform measurement using the plurality of measurement objects in the plurality of measurement gap periods,
wherein receiving the downlink data comprises receiving the downlink data in the one of the plurality of measurement objects in the one of the plurality of measurement gap periods based on the order.

14. The method of claim 13, wherein the order is based on one of:
measurement object IDs identifying a corresponding measurement object for each of the plurality of measurement gap periods; and
an explicitly configured order for each of the plurality of measurement gap periods.

15. The method of claim 11, wherein the indicator is included in downlink control information (DCI) in the second frequency carrier.

16. The method of claim 11, wherein the indicator includes demodulation information for decoding the downlink data.

17. The method of claim 11, further comprising:
applying a precoding matrix for decoding the downlink data, wherein the precoding matrix is the same as that of a reference signal contained in a first slot received by the UE in the second frequency carrier after the one of the plurality of measurement gap periods.

18. The method of claim 11 further comprising:
receiving, by the receiving circuitry, a measurement object configuration, the measurement object configuration containing a saved data indicator, wherein
when the saved data indicator indicates YES, the UE saves the downlink data in a soft buffer after the one of the plurality of measurement gap periods, and
when the saved data indicator indicates NO, the UE discards the downlink data after the one of the plurality of measurement gap periods.

19. The method of claim 11, wherein the receiving the downlink data in the first frequency carrier comprises receiving the downlink data without grant and while the UE is taking measurement during one of the plurality of measurement gap periods on the second frequency carrier.

20. A user equipment (UE) comprising:
one or more non-transitory computer-readable media having computer-executable instructions embodied thereon;
at least one processor coupled to the one or more non-transitory computer-readable media, and configured to execute the computer-executable instructions to:
receive, using receiving circuitry, downlink data in one of a plurality of measurement objects in a first frequency carrier during one of a plurality of measurement gap periods; and
receive, using the receiving circuitry, an indicator associated with the downlink data in a second frequency carrier of the UE after the one of the plurality of measurement gap periods,
wherein the indicator indicates at least one of time resource allocation information and frequency resource allocation information of the downlink data contained in the one of the plurality of measurement objects.

21. The UE of claim 20, wherein the at least one processor is further configured to execute the computer-executable instructions to:
receive, using the receiving circuitry, a measurement object configuration, the measurement object configuration containing a list of measurement object identifiers (IDs) identifying a measurement object for each of the plurality of measurement gap periods,
wherein the computer-executable instructions to receive the downlink data comprise computer-executable instructions to receive the downlink data in the one of the plurality of measurement objects identified in the list during the one of the plurality of measurement gap periods.

22. The UE of claim 20, wherein the at least one processor is further configured to execute the computer-executable instructions to:
receive a measurement object configuration, the measurement object configuration containing an order by which the UE is to perform measurement using the plurality of measurement objects in the plurality of measurement gap periods, wherein the computer-executable instructions to receive the downlink data comprise computer-executable instructions to receive the downlink data in the one of the plurality of measurement objects in the one of the plurality of measurement gap periods based on the order.

23. The UE of claim 22, wherein the order is based on one of:

measurement object IDs identifying a corresponding measurement object for each of the plurality of measurement gap periods; and an explicitly configured order for each of the plurality of measurement gap periods.

24. The UE of claim 20, wherein the indicator is included in downlink control information (DCI) in the second frequency carrier.

25. The UE of claim 20, wherein the indicator includes demodulation information for decoding the downlink data.

26. The UE of claim 20, wherein the at least one processor is further configured to execute the computer-executable instructions to:

apply a precoding matrix for decoding the downlink data, wherein the precoding matrix is the same as that of a reference signal contained in a first slot received by the UE in the second frequency carrier after the one of the plurality of measurement gap periods.

27. The UE of claim 20, wherein the at least one processor is further configured to execute the computer-executable instructions to:

receive, by the receiving circuitry, a measurement object configuration, the measurement object configuration containing a saved data indicator, wherein when the saved data indicator indicates YES, the UE saves the downlink data in a soft buffer after the one of the plurality of measurement gap periods, and when the saved data indicator indicates NO, the UE discards the downlink data after the one of the plurality of measurement gap periods.

28. The UE of claim 20, wherein the the computer-executable instructions to receive the downlink data in the first frequency carrier comprises computer-executable instructions to receive the downlink data without grant and while the UE is taking measurement during one of the plurality of measurement gap periods on the second frequency carrier.

* * * * *